US012053731B2

(12) United States Patent
Holzmann et al.

(10) Patent No.: US 12,053,731 B2
(45) Date of Patent: *Aug. 6, 2024

(54) PANEL FILTER ELEMENT

(71) Applicant: Cummins Filtration IP, Inc., Columbus, IN (US)

(72) Inventors: Mark V. Holzmann, Stoughton, WI (US); Scott W. Schwartz, Cottage Grove, WI (US); Ken Tofsland, Stoughton, WI (US)

(73) Assignee: Cummins Filtration IP, Inc., Columbus, IN (US)

( * ) Notice: Subject to any disclaimer, the term of this patent is extended or adjusted under 35 U.S.C. 154(b) by 56 days.

This patent is subject to a terminal disclaimer.

(21) Appl. No.: 17/834,438

(22) Filed: Jun. 7, 2022

(65) Prior Publication Data

US 2022/0297048 A1 Sep. 22, 2022

Related U.S. Application Data

(63) Continuation of application No. 16/500,686, filed as application No. PCT/US2018/026671 on Apr. 9, 2018, now Pat. No. 11,369,910.

(Continued)

(51) Int. Cl.
*B01D 46/00* (2022.01)
*B01D 46/10* (2006.01)
(Continued)

(52) U.S. Cl.
CPC ............ *B01D 46/10* (2013.01); *B01D 46/521* (2013.01); *B01D 46/58* (2022.01);
(Continued)

(58) Field of Classification Search
CPC .. B01D 46/10; B01D 46/0005; B01D 46/521; B01D 2271/027; B01D 2275/206;
(Continued)

(56) References Cited

U.S. PATENT DOCUMENTS 1,890,499 A 12/1932 Davies
2,203,570 A 6/1940 Hollebone
(Continued)

FOREIGN PATENT DOCUMENTS

AU 2016369578 A1 6/2018
CA 651677 A 11/1962
(Continued)

OTHER PUBLICATIONS

First Office Action issued for Chinese Patent Application No. 201880022815.6, issued Mar. 3, 2021, 8 pages.
(Continued)

*Primary Examiner* — Minh Chau T Pham
(74) *Attorney, Agent, or Firm* — Foley & Lardner LLP

(57) ABSTRACT

Panel filter elements having a pleat block and a seal member are described. The panel filter elements are arranged such that the seal members and pleat blocks can have curved and/or angled elements. The seal member of a filter element may be curved, angled, twisted, and/or has a varying cross-section. The inlet and outlet faces of the pleat block of the filter element may be curved and/or twisted instead of planar. In some arrangements, both the seal member of the filter element and the faces of the pleat blocks can be curved and/or twisted. The described filter elements may be may be flexible, such that the shape of the filter element and/or seal can conform to the shape of a filter housing, or rigid, such that the shape of the filter element remains substantially the same before and after installation into a filter housing.

19 Claims, 37 Drawing Sheets

Related U.S. Application Data

(60) Provisional application No. 62/484,093, filed on Apr. 11, 2017.

(51) Int. Cl.
  *B01D 46/52* (2006.01)
  *B01D 46/58* (2022.01)
  *F02M 35/024* (2006.01)

(52) U.S. Cl.
  CPC .. *B01D 2271/027* (2013.01); *B01D 2275/206* (2013.01); *B01D 2279/60* (2013.01); *F02M 35/02491* (2013.01)

(58) Field of Classification Search
  CPC .......... B01D 2279/60; B01D 2275/203; F02M 35/02475; F02M 35/02491
  USPC ...... 55/385.3, 495, 497, 498, 511, 521, 529; 123/198 E
  See application file for complete search history.

(56) References Cited

U.S. PATENT DOCUMENTS

| | | | |
|---|---|---|---|
| 2,457,958 A | 1/1949 | Walker | |
| 3,058,594 A | 10/1962 | Hultgren | |
| 3,144,315 A | 8/1964 | Hunn | |
| 3,273,327 A | 9/1966 | Hoffman | |
| 3,487,610 A | 1/1970 | Brown et al. | |
| 3,520,417 A | 7/1970 | Durr et al. | |
| 3,747,772 A | 7/1973 | Brown | |
| 3,793,813 A | 2/1974 | McAllister | |
| 4,236,901 A | 12/1980 | Kato et al. | |
| 4,301,012 A | 11/1981 | Puckett | |
| 4,452,619 A | 6/1984 | Wright et al. | |
| 4,462,399 A | 7/1984 | Braun | |
| 4,615,804 A | 10/1986 | Wright | |
| 4,640,698 A | 2/1987 | Ohishi et al. | |
| 4,861,359 A | 8/1989 | Tettman | |
| 5,167,740 A | 12/1992 | Michaelis et al. | |
| 5,320,657 A | 6/1994 | Adams | |
| 5,391,112 A | 2/1995 | Wardlaw | |
| 5,501,794 A | 3/1996 | Van De Graaf et al. | |
| 5,509,950 A | 4/1996 | Van De Graaf et al. | |
| 5,512,172 A | 4/1996 | Marble | |
| 5,531,892 A | 7/1996 | Duffy | |
| 5,554,205 A | 9/1996 | Ernst et al. | |
| 5,620,505 A | 4/1997 | Koch et al. | |
| 5,679,122 A * | 10/1997 | Moll ..................... | B01D 46/10 55/497 |
| 6,036,752 A | 3/2000 | Reuter | |
| 6,174,343 B1 | 1/2001 | Bloomer | |
| 6,230,777 B1 | 5/2001 | Hedlund et al. | |
| 6,306,193 B1 | 10/2001 | Morgan et al. | |
| 6,521,011 B1 | 2/2003 | Sundet et al. | |
| 6,598,749 B2 | 7/2003 | Paul et al. | |
| 6,615,893 B2 | 9/2003 | Hedlund et al. | |
| 6,616,785 B2 | 9/2003 | Hedlund et al. | |
| 6,656,243 B2 | 12/2003 | Hodge | |
| 6,709,480 B2 | 3/2004 | Sundet et al. | |
| 6,752,846 B2 | 6/2004 | Rotter et al. | |
| 6,758,878 B2 | 7/2004 | Choi et al. | |
| 6,932,850 B1 | 8/2005 | Welch et al. | |
| 6,986,842 B2 | 1/2006 | Bortnik et al. | |
| 7,004,989 B2 | 2/2006 | Karlsson | |
| 7,217,333 B2 | 5/2007 | Sundet et al. | |
| 7,235,115 B2 | 6/2007 | Duffy et al. | |
| 7,247,183 B2 | 7/2007 | Connor et al. | |
| 7,438,738 B2 | 10/2008 | Uneta et al. | |
| 7,503,953 B2 | 3/2009 | Sundet et al. | |
| 7,622,063 B2 | 11/2009 | Sundet et al. | |
| 7,727,299 B2 | 6/2010 | Knowles | |
| 7,896,940 B2 | 3/2011 | Sundet et al. | |
| 7,959,700 B2 | 6/2011 | Kidman | |
| 8,061,530 B2 | 11/2011 | Kindkeppel et al. | |
| 8,062,404 B2 | 11/2011 | Volkmer et al. | |
| 8,075,720 B2 | 12/2011 | Fall et al. | |
| 8,137,427 B2 | 3/2012 | Bouhanna et al. | |
| 8,142,538 B2 | 3/2012 | Sundet et al. | |
| 8,157,881 B1 | 4/2012 | Anoszko et al. | |
| 8,197,571 B2 | 6/2012 | Porter | |
| 8,292,983 B2 | 10/2012 | Reichter et al. | |
| 8,328,895 B2 | 12/2012 | Nicholas | |
| 8,398,735 B2 | 3/2013 | Bouhanna et al. | |
| 8,414,674 B2 | 4/2013 | Anoszko et al. | |
| 8,419,817 B2 | 4/2013 | Sundet et al. | |
| 8,491,689 B2 | 7/2013 | Duffy et al. | |
| 8,545,658 B2 | 10/2013 | Spearin et al. | |
| 8,673,196 B2 | 3/2014 | Treier et al. | |
| 8,852,308 B2 | 10/2014 | Jarrier | |
| 8,852,310 B2 | 10/2014 | Holzmann et al. | |
| 8,888,885 B2 | 11/2014 | Barreteau et al. | |
| 8,945,267 B2 | 2/2015 | Anoszko et al. | |
| 9,084,957 B2 | 7/2015 | Rocklitz | |
| 9,174,159 B2 | 11/2015 | Sanocki et al. | |
| 9,278,301 B2 | 3/2016 | Fox et al. | |
| 9,320,997 B2 | 4/2016 | Campbell et al. | |
| 9,370,742 B2 | 6/2016 | Edwards et al. | |
| 9,371,777 B2 | 6/2016 | Bryant et al. | |
| 10,279,301 B2 | 5/2019 | Zhang | |
| 10,729,999 B2 | 8/2020 | Nichols et al. | |
| 11,369,910 B2 * | 6/2022 | Holzmann ........... | B01D 46/521 |
| 2003/0192293 A1 | 10/2003 | Choi et al. | |
| 2004/0112526 A1 | 6/2004 | Choi et al. | |
| 2005/0204714 A1 | 9/2005 | Sundet et al. | |
| 2005/0217226 A1 | 10/2005 | Sundet et al. | |
| 2006/0246260 A1 | 11/2006 | Sundet et al. | |
| 2007/0102101 A1 | 5/2007 | Spearin et al. | |
| 2007/0180803 A1 | 8/2007 | Sundet et al. | |
| 2007/0262016 A1 | 11/2007 | Fall et al. | |
| 2007/0271887 A1 | 11/2007 | Osborne et al. | |
| 2007/0289273 A1 | 12/2007 | Boyd | |
| 2008/0047240 A1 | 2/2008 | Trautmann et al. | |
| 2008/0083200 A1 * | 4/2008 | Gruber .................... | B62J 37/00 55/385.3 |
| 2008/0209875 A1 | 9/2008 | Treier et al. | |
| 2008/0245726 A1 | 10/2008 | Senetar | |
| 2009/0019823 A1 | 1/2009 | Juliar et al. | |
| 2009/0019824 A1 | 1/2009 | Lawrence | |
| 2009/0056293 A1 | 3/2009 | Styles | |
| 2009/0081416 A1 | 3/2009 | Goodrich | |
| 2009/0217820 A1 | 9/2009 | Neudeck | |
| 2009/0233023 A1 | 9/2009 | Goodrich | |
| 2010/0000190 A1 | 1/2010 | Kidman | |
| 2010/0050582 A1 | 3/2010 | Sundet et al. | |
| 2010/0078379 A1 | 4/2010 | Rocklitz | |
| 2010/0108598 A1 | 5/2010 | Haberkamp et al. | |
| 2010/0229513 A1 * | 9/2010 | Eisengraeber-Pabst ..................... | B01D 46/10 156/227 |
| 2010/0229543 A1 | 9/2010 | Venghaus et al. | |
| 2010/0236204 A1 | 9/2010 | Bouhanna et al. | |
| 2010/0269463 A1 | 10/2010 | Duffy et al. | |
| 2010/0300052 A1 | 12/2010 | Porter | |
| 2011/0138760 A1 | 6/2011 | Sundet et al. | |
| 2011/0152054 A1 | 6/2011 | Fall et al. | |
| 2011/0186504 A1 | 8/2011 | Rocklitz | |
| 2011/0252759 A1 | 10/2011 | Nicholas | |
| 2011/0277430 A1 | 11/2011 | Nicholas | |
| 2012/0055127 A1 | 3/2012 | Holzmann et al. | |
| 2012/0117931 A1 | 5/2012 | Anoszko et al. | |
| 2012/0180664 A1 | 7/2012 | Lundquist | |
| 2012/0227367 A1 | 9/2012 | Bouhanna et al. | |
| 2013/0062276 A1 | 3/2013 | Barreteau et al. | |
| 2013/0091818 A1 | 4/2013 | Anoszko et al. | |
| 2013/0174527 A1 | 7/2013 | Platt | |
| 2013/0189081 A1 | 7/2013 | Bryant et al. | |
| 2013/0205732 A1 | 8/2013 | Gillilan | |
| 2013/0306548 A1 | 11/2013 | Kreibig | |
| 2014/0008285 A1 | 1/2014 | Nohren, Jr. et al. | |
| 2014/0065498 A1 | 3/2014 | Fischer et al. | |
| 2014/0137524 A1 | 5/2014 | Jarrier | |
| 2014/0144115 A1 | 5/2014 | Anoszko et al. | |
| 2014/0209528 A1 | 7/2014 | Eleftherakis et al. | |

(56) References Cited

U.S. PATENT DOCUMENTS

| | | |
|---|---|---|
| 2014/0209529 A1 | 7/2014 | Eleftherakis et al. |
| 2014/0230385 A1 | 8/2014 | Schuld et al. |
| 2014/0235419 A1 | 8/2014 | Lise et al. |
| 2014/0237967 A1 | 8/2014 | Anoszko et al. |
| 2014/0260138 A1 | 9/2014 | Edwards et al. |
| 2015/0013290 A1 | 1/2015 | Holzmann et al. |
| 2015/0013542 A1 | 1/2015 | Hasenfratz et al. |
| 2015/0047507 A1 | 2/2015 | Fox et al. |
| 2015/0047508 A1 | 2/2015 | Sanocki et al. |
| 2015/0101296 A1 | 4/2015 | Ferreira |
| 2015/0107204 A1 | 4/2015 | Anoszko et al. |
| 2015/0113929 A1 | 4/2015 | Jackson |
| 2015/0165348 A1 | 6/2015 | Lo |
| 2015/0165352 A1 | 6/2015 | Lang |
| 2015/0246308 A1 | 9/2015 | Lans |
| 2015/0251111 A1 | 9/2015 | Savstrom et al. |
| 2015/0290562 A1 | 10/2015 | Oberli et al. |
| 2015/0375142 A1 | 12/2015 | Rocklitz |
| 2016/0031124 A1* | 2/2016 | Van Dyck ......... B29C 45/14418 264/254 |
| 2016/0108866 A1 | 4/2016 | Dewit et al. |
| 2016/0144312 A1 | 5/2016 | Fox et al. |
| 2016/0199757 A1 | 7/2016 | Nohren et al. |
| 2016/0214053 A1 | 7/2016 | Schwartz |

FOREIGN PATENT DOCUMENTS

| | | |
|---|---|---|
| CN | 101522973 | 9/2009 |
| CN | 103038491 | 4/2013 |
| CN | 103889537 A | 6/2014 |
| CN | 104667669 A | 6/2015 |
| CN | 105050685 | 11/2015 |
| CN | 105407999 A | 3/2016 |
| DE | 36 22 955 A1 | 1/1988 |
| DE | 88 08 632 U1 | 9/1988 |
| DE | 37 09 827 A1 | 10/1988 |
| DE | 38 34 942 A1 | 4/1989 |
| DE | 39 36 838 A1 | 5/1991 |
| DE | 10 2010 053 744 | 6/2012 |
| DE | 10 2013 007 868 B4 | 4/2017 |
| DE | 10 2016 005 660 A1 | 11/2017 |
| EP | 0 170 643 A2 | 2/1986 |
| EP | 0 380 026 A1 | 8/1990 |
| EP | 0 438 639 A1 | 7/1991 |
| EP | 0 441 045 A2 | 8/1991 |
| GB | 1 570 385 A | 7/1980 |
| JP | S5335267 A | 4/1978 |
| JP | 11-280570 A | 10/1999 |
| JP | 2006-116522 A | 5/2006 |
| WO | WO-92/09309 A2 | 6/1992 |
| WO | WO-92/09311 A1 | 6/1992 |
| WO | WO-93/12858 A1 | 7/1993 |
| WO | WO-2007/090011 A2 | 8/2007 |
| WO | WO-2017/106752 A1 | 6/2017 |

OTHER PUBLICATIONS

International Search Report & Written Opinion for PCT/US2018/026671, dated Jun. 22, 2018, 13 pages.

Chinese Office Action issued for Chinese Patent Application No. CN 202111072720.5 issued Jun. 6, 2022, 9 pages with English translation.

* cited by examiner

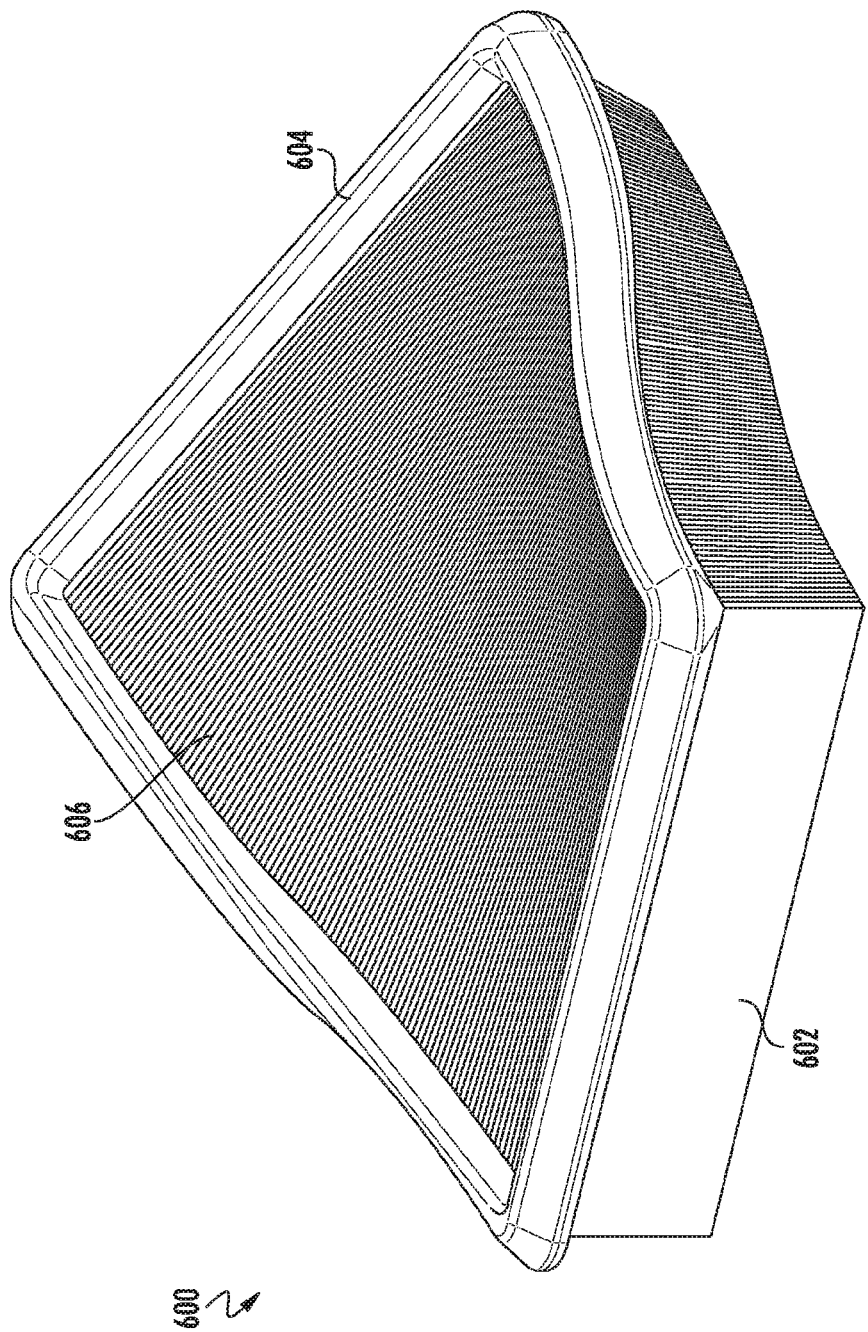

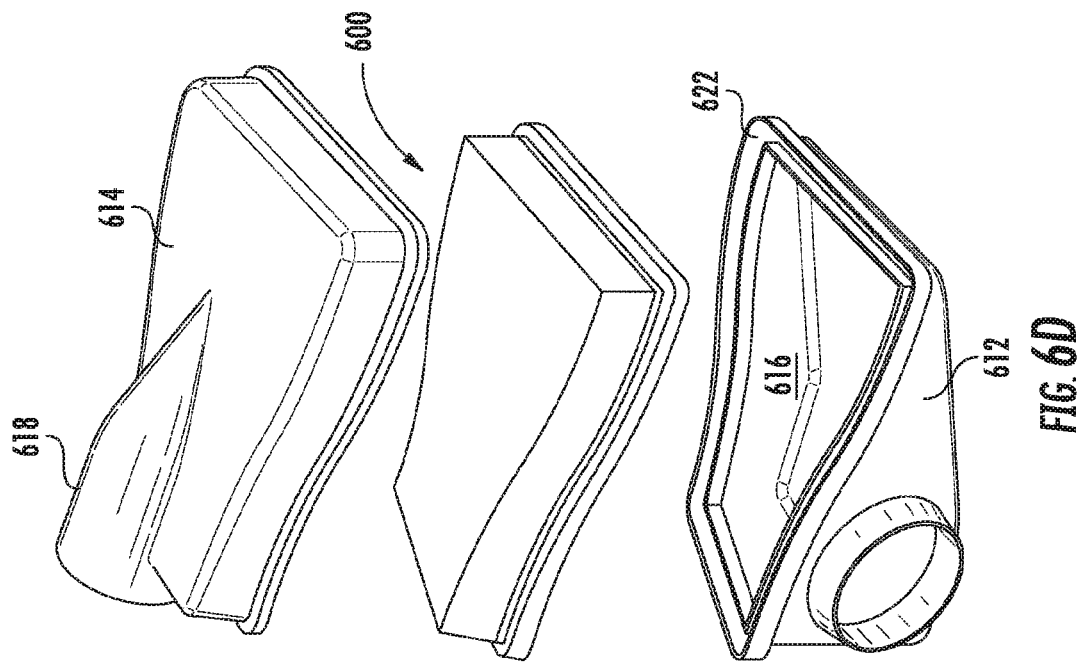
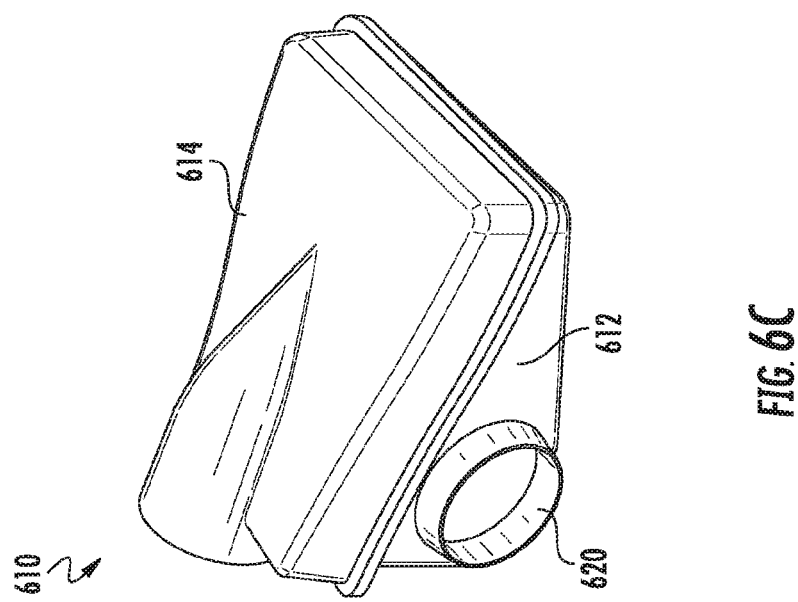

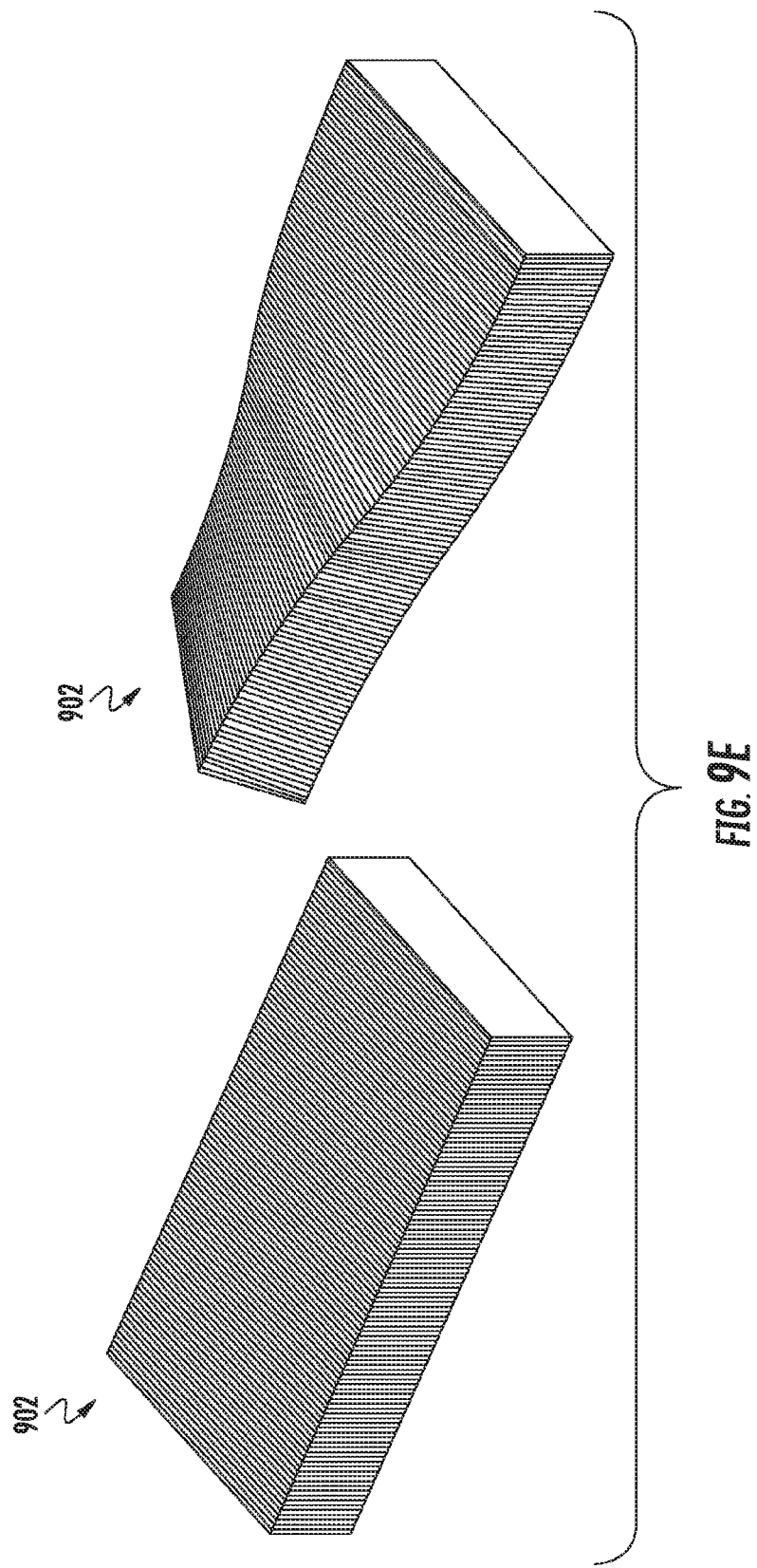

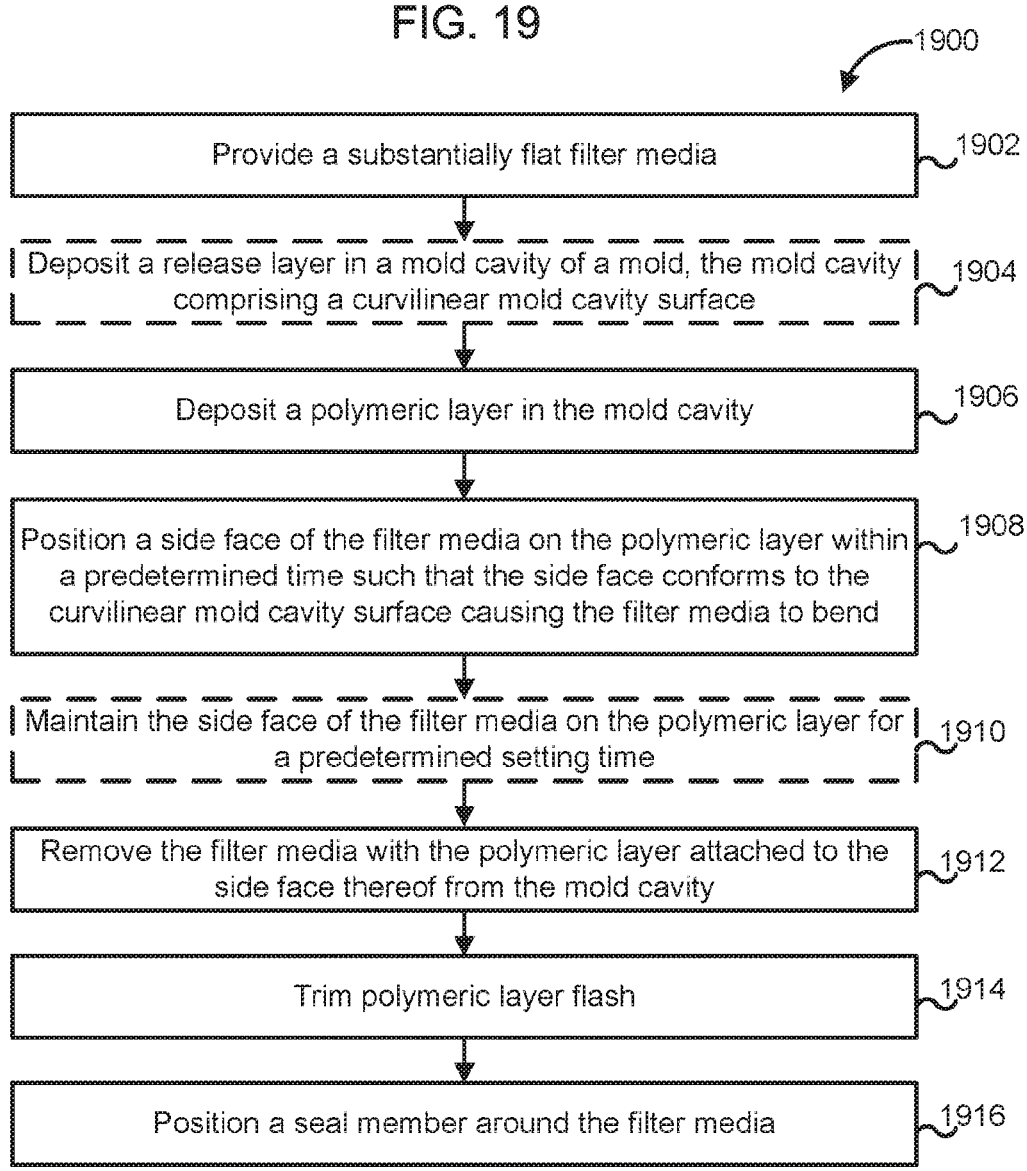

PANEL FILTER ELEMENT

CROSS REFERENCE TO RELATED APPLICATIONS

This application is a continuation of U.S. patent application Ser. No. 16/500,686, filed Oct. 3, 2019, now U.S. Pat. No. 11,369,910, which is a national stage of PCT Application No. PCT/US2018/026671, filed Apr. 9, 2018, which claims priority to U.S. Provisional Patent Application No. 62/484,093, entitled "PANEL FILTER ELEMENT," filed on Apr. 11, 2017. The contents of these applications are incorporated herein by reference in their entirety and for all purposes.

TECHNICAL FIELD

The present application relates to filter elements.

BACKGROUND

Internal combustion engines generally combust a mixture of fuel (e.g., gasoline, diesel, natural gas, etc.) and air. Prior to entering the engine, the intake air is typically passed through a filtration system to remove contaminants (e.g., dust, water, oil, etc.) from the intake air. The filtration system includes a filter element having filter media. As the air passes through the filter media of the filter element, the filter media removes at least a portion of the contaminants in the air thereby preventing unwanted contaminants from entering the internal combustion engine.

Panel-type air filter elements are often used in automotive applications. The panel-type air filter elements typically comprise pleated filter media and a polyurethane sealing gasket which is molded directly to the pleated media pack. The pleated media pack and the sealing gasket are generally defined by planar sides, and the seal is typically rectangular in overall shape. The flat and rigid shape of the panel air filter element creates a design constraint where the gasket sealing surface is contained within a flat plane. Typically this gasket plane is parallel to the inlet and outlet flow faces of the media pack, which are also parallel to each other. In some cases, the planar gasket may be angled slightly with respect to the flow faces of the media pack. This arrangement takes up a lot of space, which is a large design constraint for engine compartments.

SUMMARY

Various example embodiments relate to filter elements having non-planar inlet and outlet faces and curvilinear seal members. One example embodiment relates to a filter element. The filter element includes filter media forming a pleat block having an inlet face and an outlet face. The filter element further includes a seal member coupled to the pleat block. The inlet face and the outlet face are non-planar in shape when the filter element is in an installed position in a filtration system housing.

Other example embodiments relate to a filter assembly. The filter assembly comprises a filter housing and a filter element. The filter element comprises filter media forming a pleat block having an inlet face and an outlet face. The filter element further comprises a seal member coupled to the pleat block, the seal member compressing against the filter housing when the filter element is installed within the filter housing, thereby forming a seal with the filter housing. The inlet face and the outlet face are non-planar in shape when the filter element is in an installed position within the filter housing.

Another example embodiment relates to a method for forming a curvilinear filter element. The method comprises providing a substantially flat filter media. A polymeric layer is deposited in a mold cavity of mold, the mold cavity comprising a curvilinear mold cavity surface. A side face of the filter media is positioned on the polymeric layer within a predetermined time such that the side face conforms to the curvilinear mold cavity surface causing the filter media to bend. The filter media with the polymeric layer attached to the side surface of the filter media is removed from the mold cavity.

These and other features, together with the organization and manner of operation thereof, will become apparent from the following detailed description when taken in conjunction with the accompanying drawings, wherein like elements have like numerals throughout the several drawings described below.

BRIEF DESCRIPTION OF THE FIGURES

FIG. 6A shows a perspective view of a filter element 600 according to a further example embodiment. FIG. 6C shows a perspective view of a housing that is configured to receive the filter element of FIG. 6A according to an example embodiment. FIG. 6D shows an exploded view of the housing of FIG. 6C.

FIG. 8A shows the filter element in an uninstalled or flat position. FIG. 8B shows the filter element in an installed or curved position.

FIGS. 9A through 9E show different views of a filter element changing from a first position to a second position according to an example embodiment. FIG. 9A shows a top view of the filter element in the first position and the second position. FIG. 9B shows a perspective view of the filter element in the first position and the second position. FIG. 9C shows a side view of the filter element in the first position and the second position. FIG. 9D shows another side view of the filter element in the second position. FIG. 9E shows a perspective view of the pleat block of the filter element in the first position and the second position.

FIG. 19 is a schematic flow diagram of an method for forming a curvilinear filter element, according to an embodiment.

DETAILED DESCRIPTION

Referring to the figures generally, panel filter elements having a pleat block and a seal member are described. The described panel filter elements are arranged such that the seal members and pleat blocks can have curved and/or angled elements. In some arrangements, the seal member of a filter element is curved, angled, twisted, and/or has a varying cross-section. In other arrangements, the inlet and outlet faces of the pleat block of the filter element may be curved and/or twisted instead of planar. In still further arrangements, both the seal member of the filter element and the faces of the pleat blocks can be curved and/or twisted. The described filter elements may be may be flexible, such that the shape of the filter element and/or seal can conform to the shape of a filter housing, or rigid, such that the shape of the filter element remains substantially the same before and after installation into a filter housing.

Figure 1A:
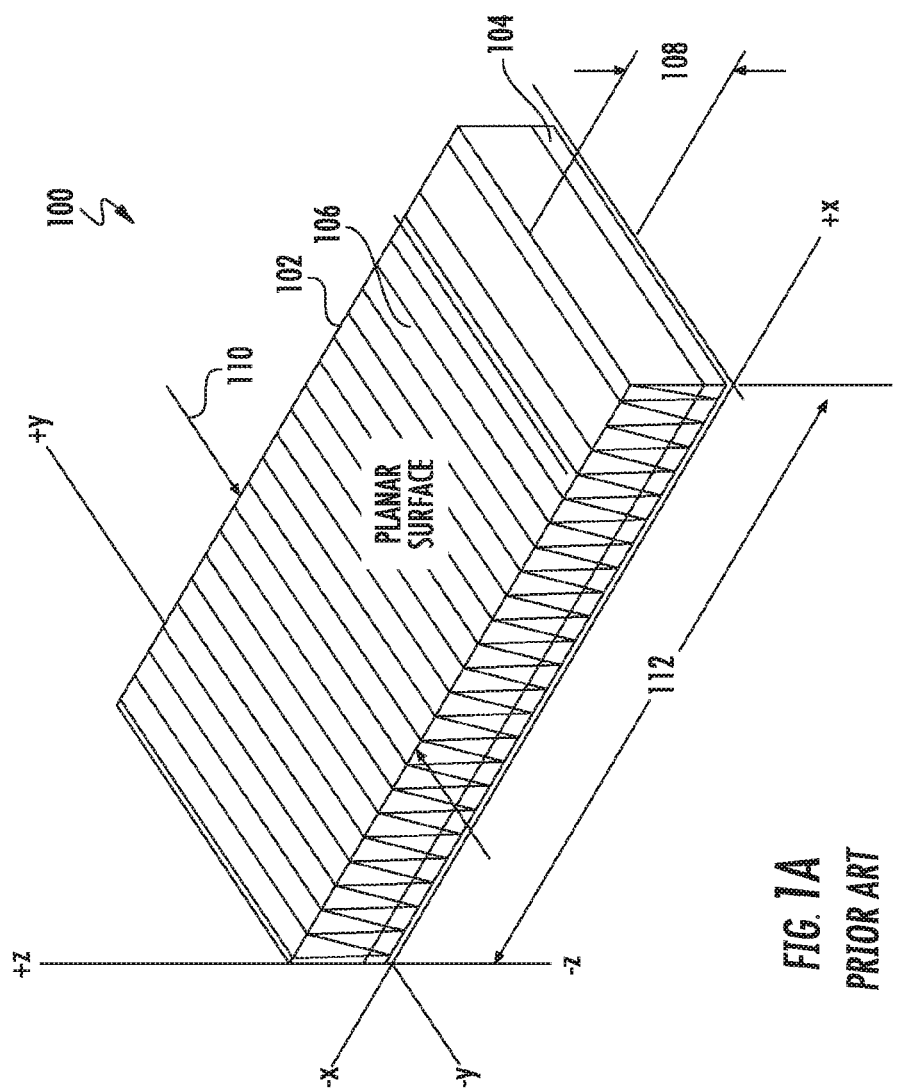
FIG. 1A shows a perspective view of an example conventional filter element.

Referring to FIG. 1A, a perspective view of a filter element 100 is shown. The filter element 100 is a panel filter element of a known arrangement. The filter element 100 and the description of FIG. 1A will serve as a basis for distinguishing the inventive concepts described herein from a planar panel filter element. The filter element 100 generally comprises a pleat block 102 and a seal member 104. The pleat block 102 is a pleated filter media pleat block. The pleat block 102 has a first face 106 and a second face (not shown) opposite the first face 106 and generally parallel to the second face. In some arrangements, the first face 106 is an inlet face and the second face is an outlet face. In such arrangements, air to be filtered flows into the pleat block 102 through the first face 106, passes through the filter media, and out of the pleat block 102 through the second face. In other arrangements, the first face 106 is an outlet face, and the flow through the pleat block 102 is reversed. The filter element 100 is substantially rigid along the pleat length 110 (described below) such that the shape of the filter element 100 is maintained. The rigidity may be achieved through the use of a frame (e.g., a hard urethane frame, an injection molded frame, a thermoformed frame, a roto-molded frame, a 3D printed frame, a stamped metal frame, etc.) or stiffening members (e.g., pleating stabilization beads, spraying the pleat block 102 edges with a stiffening agent, such as BASF® Elastocast 55090, polyurethane, edge bonding, etc.). In other embodiments, a glued-in curved frame (e.g., a comb style frame) could be used to maintain the sealing curve shape for mating between a filter cover and housing.

The filter element 100 is shown with a Cartesian coordinate system having an X-axis, a Y-axis, and a Z-axis for reference purposes. As shown in FIG. 1A, the first face 106 and the second face are planar in shape. Each face or side of the pleat block 102 is generally planar in shape. Accordingly, the pleat block 102 forms a right rectangular cuboid. The first face 106 and the second face are parallel to each other and spaced apart by a pleat height 108 (measured along the Z-axis). The pleat height 108 is uniform throughout the pleat block 102. The height of the pleat block 102 is the same as the pleat height 108. The width of the pleat block 102 is defined by the pleat length 110 (measured along the Y-axis). The length of the pleat block 102 is defined by the pleat block length 112 (measured along the X-axis). The pleat block length 112 can also be used to determine the number of pleats in the pleat block (pleat block length 112 divided by the pleats per inch of the filter media).

The seal member 104 wraps around the pleat block 102 as shown in FIG. 1A. The seal member 104 may be formed from and/or attached to the pleat block 102 with an adhesive (e.g., polyurethane). The seal member 104 is comprised of a flexible material, such as urethane, and is configured to be compressed against a housing to form a seal against a housing. Each length of the seal member 104 (i.e., the length of the seal member that extends the pleat block length 112 and/or the pleat length 110) is linear and generally parallel to the respective axis of the Cartesian coordinate system.

As described in further detail below, the filter elements of the present disclosure are structured such that the seal members and pleat blocks can have curved and/or angled elements. For example, the described filter elements differ from the filter element 100 in that the inlet and outlet faces may be curved instead of planar, the seal members may be angled or curved instead of linear and parallel to the respective axis, the filter elements may be flexible instead of rigid, or a combination thereof.

Figure 1B:
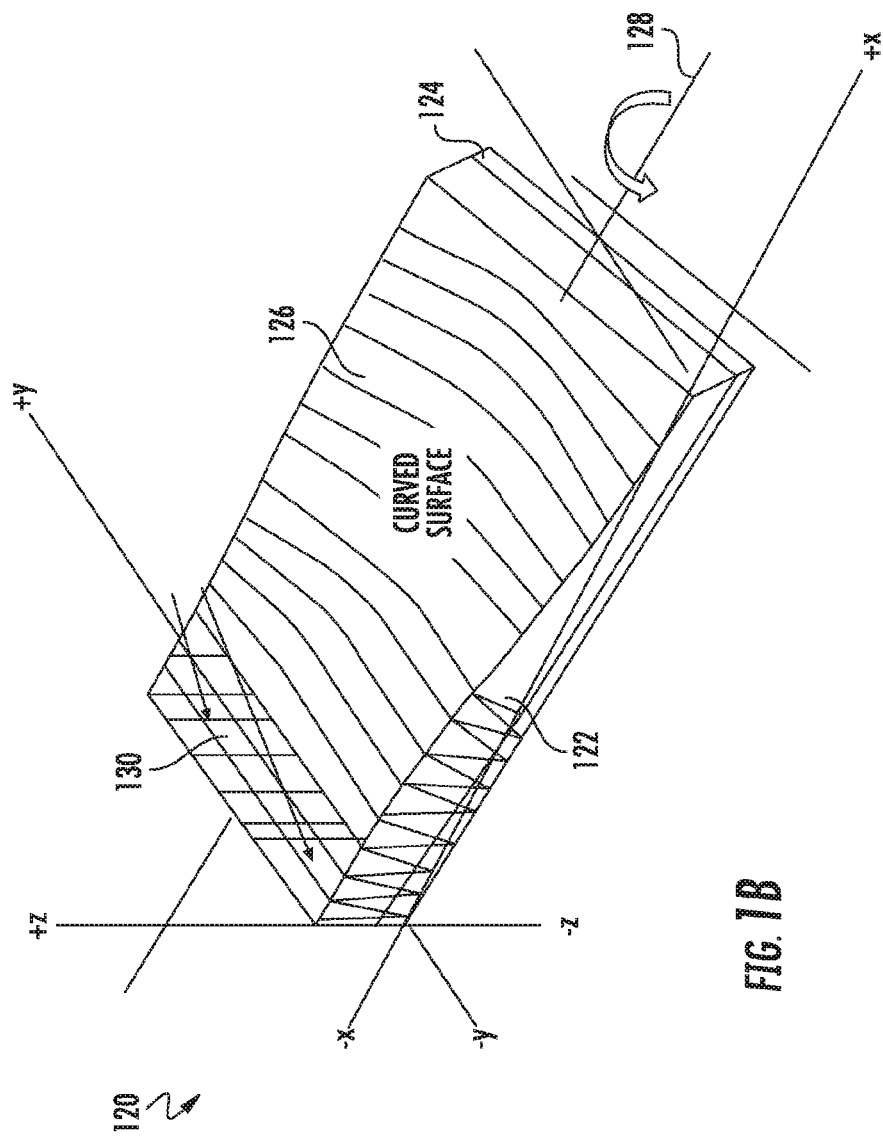
FIG. 1B shows a perspective view of a filter element on the same Cartesian coordinate system as the filter element of FIG. 1A.

One such example filter element that highlights the curved faces is shown in FIG. 1B. FIG. 1B shows a perspective view of a filter element 120 on the same Cartesian coordinate system as the filter element 100. The filter element 120 is similar to the filter element 100. The primary difference between the filter element 120 and the filter element 100 is the arrangement of the pleat block 122. The filter element 120 generally comprises a pleat block 122 and a seal member 124. The pleat block 122 is a pleated filter media pleat block. The pleat block 122 has a first face 126 and a second face (not shown) opposite the first face 126. In some arrangements, the first face 126 is an inlet face and the second face is an outlet face. In such arrangements, air to be filtered flows into the pleat block 122 through the first face 126, passes through the filter media, and out of the pleat block 122 through the second face. In other arrangements, the first face 126 is an outlet face, and the flow through the pleat block 122 is reversed. The filter element 120 is substantially rigid such that the shape of the filter element 120 is maintained. The rigidity may be achieved through the use of a frame (e.g., a hard urethane frame, an injection molded frame, a thermoformed frame, a roto-molded frame, a 3D printed frame, a stamped metal frame, etc.) or stiffening members (e.g., pleating stabilization beads, spraying the pleat block 102 edges with a stiffening agent, such as BASF® Elastocast 55090, polyurethane, edge bonding, etc.).

Unlike the filter element 100, each face or side of the pleat block 122 includes at least a portion that is non-planar (e.g., curvilinear) in shape. For example, the pleat block 122 may be curved, may be rotated about a central axis 128, or a combination thereof. In some arrangements, the resulting pleat block 122 has faces that are curved or non-planar in shape. In other arrangements, the resulting pleat block 122 includes a planar section 130 (e.g., having a rectangular shape, a triangular shape, etc.) and a curved section (e.g., the portion of the first face 126 other than the planar section 130).

The seal member 124 wraps around the pleat block 122. The seal member 124 may be formed from and/or attached to the pleat block 122 with an adhesive (e.g., polyurethane). The seal member 124 is comprised of a flexible material, such as urethane, and is configured to be compressed against a housing to form a seal against a housing. Unlike the seal member 104 of the filter element 100, the seal member 124 is curved and/or twisted to match the curved shape of the pleat block 122.

Figure 2:
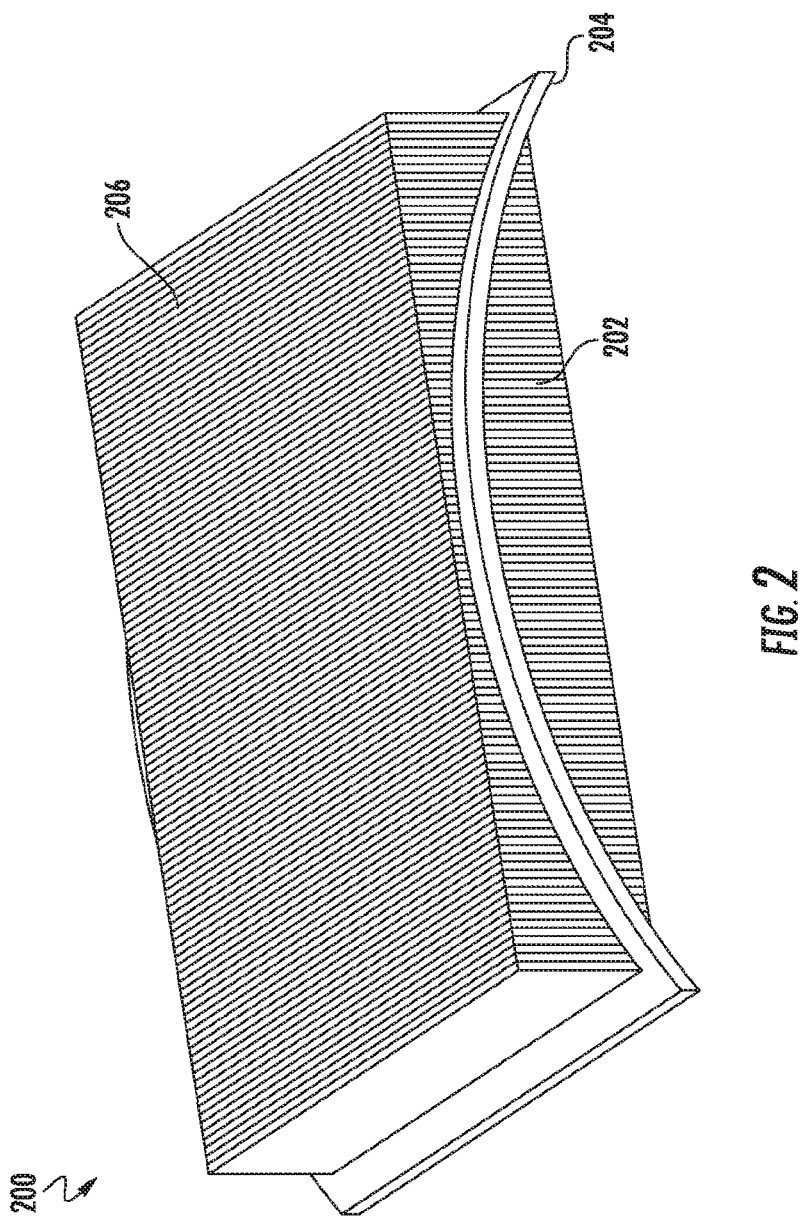
FIG. 2 shows a perspective view of a filter element according to an example embodiment.

Referring to FIG. 2, a perspective view of a filter element 200 is shown according to an example embodiment. The filter element 200 is similar to the filter element 100. The primary difference between the filter element 200 and the filter element 100 is the arrangement of the seal member. The filter element 200 is a panel filter element. The filter element 200 generally comprises a pleat block 202 and a seal member 204. The pleat block 202 is a pleated filter media pleat block. Each face or side of the pleat block 202 is generally planar in shape. Accordingly, the pleat block 202 forms a right rectangular cuboid. The pleat block 202 has a first face 206 and a second face (not shown) opposite the first face 206 and generally parallel to the first face 206. In some arrangements, the first face 206 is an inlet face and the second face is an outlet face. In such arrangements, air to be filtered flows into the pleat block 202 through the first face 206, passes through the filter media, and out of the pleat block 202 through the second face. In other arrangements, the first face 206 is an outlet face, and the flow through the pleat block 202 is reversed. The filter element 200 is substantially rigid such that the shape of the filter element 200 and the pleat block 202 is maintained. The rigidity may be achieved through the use of a frame (e.g., a hard urethane frame, an injection molded frame, a thermoformed frame, a roto-molded frame, a 3D printed frame, a stamped metal frame, etc.) or stiffening members (e.g., pleating stabilization beads, spraying the pleat block 102 edges with a stiffening agent, such as BASF® Elastocast 55090, polyurethane, edge bonding, etc.).

The seal member 204 wraps around the pleat block 202 as shown in FIG. 2. The seal member 204 may be formed from and/or attached to the pleat block 202 with an adhesive (e.g., polyurethane). The seal member 204 is comprised of a flexible material, such as urethane, and is configured to be compressed against a housing to form a seal against a housing. Unlike the seal member 104 of the filter element 100, two lengths of the seal member 204 are arched (i.e., curved) along one axis. The arched lengths of the seal member 204 are configured to interact with complimentarily arched or curved surfaces of a filter housing.

Figure 3:
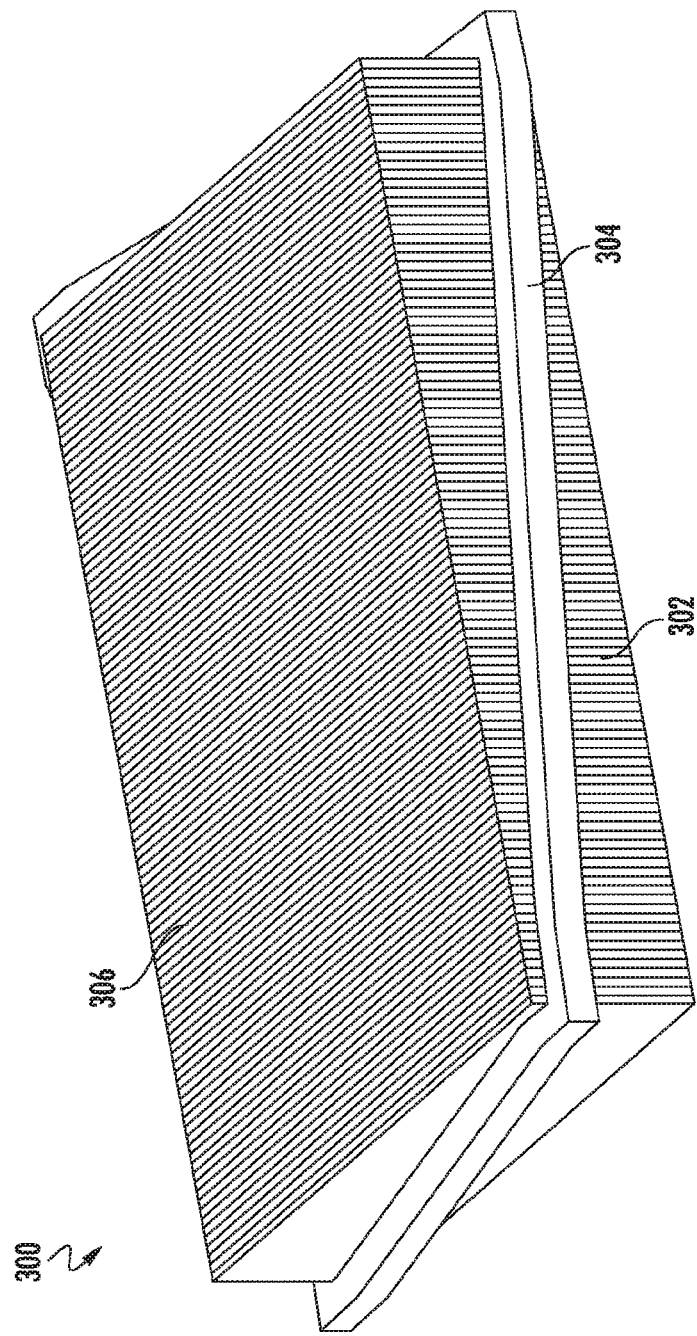
FIG. 3 shows a perspective view of a filter element according to another example embodiment.

Referring to FIG. 3, a perspective view of a filter element 300 is shown according to an example embodiment. The filter element 300 is similar to the filter element 100. The primary difference between the filter element 300 and the filter element 100 is the arrangement of the seal member. The filter element 300 is a panel filter element. The filter element 300 generally comprises a pleat block 302 and a seal member 304. The pleat block 302 is a pleated filter media pleat block. Each face or side of the pleat block 302 is generally planar in shape. Accordingly, the pleat block 302 forms a right rectangular cuboid. The pleat block 302 has a first face 306 and a second face (not shown) opposite the first face 306 and generally parallel to the first face 306. In some arrangements, the first face 306 is an inlet face and the second face is an outlet face. In such arrangements, air to be filtered flows into the pleat block 302 through the first face 306, passes through the filter media, and out of the pleat block 302 through the second face. In other arrangements, the first face 306 is an outlet face, and the flow through the pleat block 302 is reversed. The filter element 300 is substantially rigid such that the shape of the filter element 300 and the pleat block 302 is maintained. The rigidity may be achieved through the use of a frame (e.g., a hard urethane frame, an injection molded frame, a thermoformed frame, a roto-molded frame, a 3D printed frame, a stamped metal frame, etc.) or stiffening members (e.g., pleating stabilization beads, spraying the pleat block 102 edges with a stiffening agent, such as BASF® Elastocast 55090, polyurethane, edge bonding, etc.).

The seal member 304 wraps around the pleat block 302 as shown in FIG. 3. The seal member 304 may be formed from and/or attached to the pleat block 302 with an adhesive (e.g., polyurethane). The seal member 304 is comprised of a flexible material, such as urethane, and is configured to be compressed against a housing to form a seal against a housing. Unlike the seal member 104 of the filter element 100, each length of the seal member 304 is angled or curved with respect to an axis. The angled or curved lengths of the seal member 304 are configured to interact with complimentarily arched or curved surfaces of a filter housing.

Figure 4:
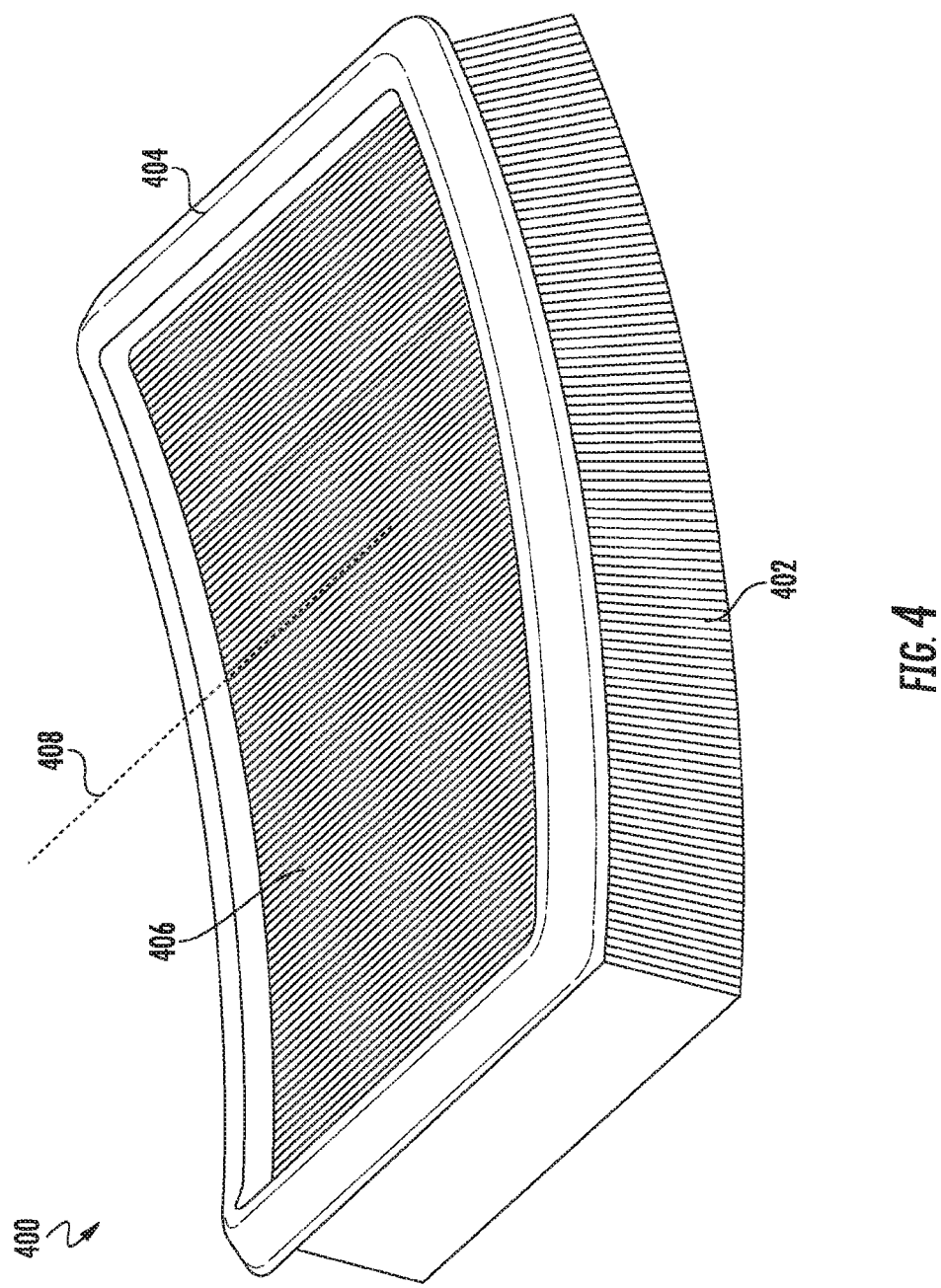
FIG. 4 shows a perspective view of a filter element according to a further example embodiment.

Referring to FIG. 4, a perspective view of a filter element 400 is shown according to another example embodiment. The filter element 400 is similar to the filter element 100. The primary difference between the filter element 400 and the filter element 100 is arrangement of the pleat block. The filter element 400 is a panel filter element. The filter element 400 generally comprises a pleat block 402 and a seal member 404. The pleat block 402 is a pleated filter media pleat block. Unlike the filter element 100, each face or side of the pleat block 402 two of the sides or faces of the pleat block 402 are curved such that they are non-planar in shape. In some arrangements, the first face 406 is an inlet face and the second face is an outlet face. In such arrangements, air to be filtered flows into the pleat block 402 through the first face 406, passes through the filter media, and out of the pleat block 402 through the second face. In other arrangements, the first face 406 is an outlet face, and the flow through the pleat block 402 is reversed. The filter element 400 is substantially rigid such that the shape of the filter element 400 and the pleat block 402 is maintained. The rigidity may be achieved through the use of a frame (e.g., a hard urethane frame, an injection molded frame, a thermoformed frame, a roto-molded frame, a 3D printed frame, a stamped metal frame, etc.) or stiffening members (e.g., pleating stabilization beads, spraying the pleat block 102 edges with a stiffening agent, such as BASF® Elastocast 55090, polyurethane, edge bonding, etc.).

Both the first face 406 and the second face are curved about an axis 408. The curve causes a non-planar shape of both the first face 406 and the second face. The shape of the first face 406 and the second face partially wraps around the axis 408. The axis 408 is parallel to the direction of the folds of the filter media forming the pleats of the filter media of the pleat block 402. The curve of the first face 406 and the second face causes the pleats to fan out more than a cuboid pleat block (e.g., the pleat block of filter elements 100, 200, or 300). The fanning of the pleats improves dust loading characteristics of the filter media of the pleat block 402.

The seal member 404 wraps around the pleat block 402 as shown in FIG. 4. The seal member 404 may be formed from and/or attached to the pleat block 402 with an adhesive (e.g., polyurethane) or through a compressive press fit. The seal member 404 is comprised of a flexible material, such as urethane, and is configured to be compressed against a housing to form a seal against a housing. Unlike the seal member 104 of the filter element 100, two of the lengths of the seal member 404 are curved with respect to the axis 408 to match the curvature of the first face 406. The curved lengths of the seal member 404 are configured to interact with complimentarily arched or curved surfaces of a filter housing.

Figure 5:
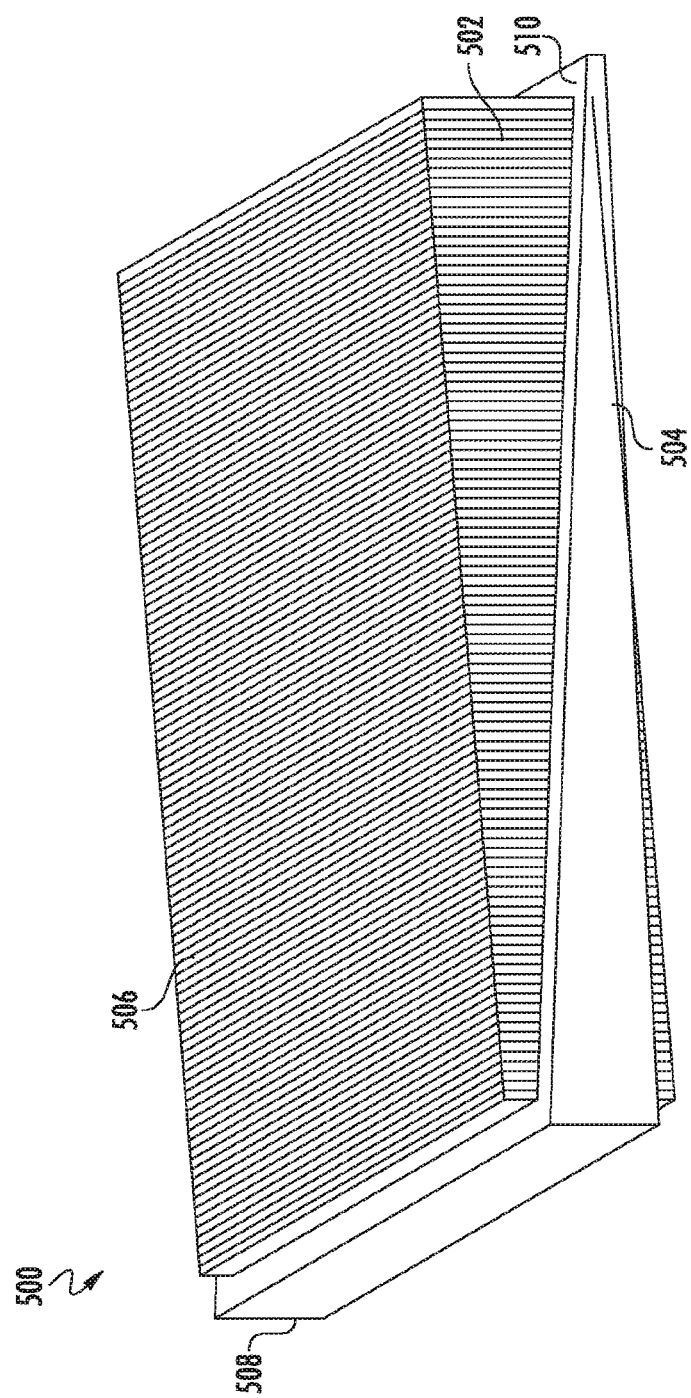
FIG. 5 shows a perspective view of a filter element according to another example embodiment.

Referring to FIG. 5, a perspective view of a filter element 500 is shown according to still another example embodiment. The filter element 500 is similar to the filter element 100. The primary difference between the filter element 500 and the filter element 100 is the arrangement of the seal member. The filter element 500 is a panel filter element. The filter element 500 generally comprises a pleat block 502 and a seal member 504. The pleat block 502 is a pleated filter media pleat block. Each face or side of the pleat block 502 is generally planar in shape. Accordingly, the pleat block 502 forms a right rectangular cuboid. The pleat block 502 has a first face 506 and a second face (not shown) opposite the first face 506 and generally parallel to the first face 506. In some arrangements, the first face 506 is an inlet face and the second face is an outlet face. In such arrangements, air to be filtered flows into the pleat block 502 through the first face 506, passes through the filter media, and out of the pleat block 502 through the second face. In other arrangements, the first face 506 is an outlet face, and the flow through the pleat block 502 is reversed. The filter element 500 is substantially rigid such that the shape of the filter element 500 and the pleat block 502 is maintained. The rigidity may be achieved through the use of a frame (e.g., a hard urethane frame, an injection molded frame, a thermoformed frame, a roto-molded frame, a 3D printed frame, a stamped metal frame, etc.) or stiffening members (e.g., pleating stabilization beads, spraying the pleat block 102 edges with a stiffening agent, such as BASF® Elastocast 55090, polyurethane, edge bonding, etc.).

The seal member 504 wraps around the pleat block 502 as shown in FIG. 5. The seal member 504 may be formed from and/or attached to the pleat block 502 with an adhesive (e.g., polyurethane) or through a compressive press fit. The seal member 504 is comprised of a flexible material, such as urethane, and is configured to be compressed against a housing to form a seal against a housing. Unlike the seal member 104 of the filter element 100, two lengths of the seal member 504 are angled with respect to the plane defined by the first face 506. Additionally, the thickness of the seal member 504 varies from a think end 508 to a thin end 510. The angled lengths of the seal member 504 are configured to interact with complimentarily arched or curved surfaces of a filter housing.

Figure 6B:
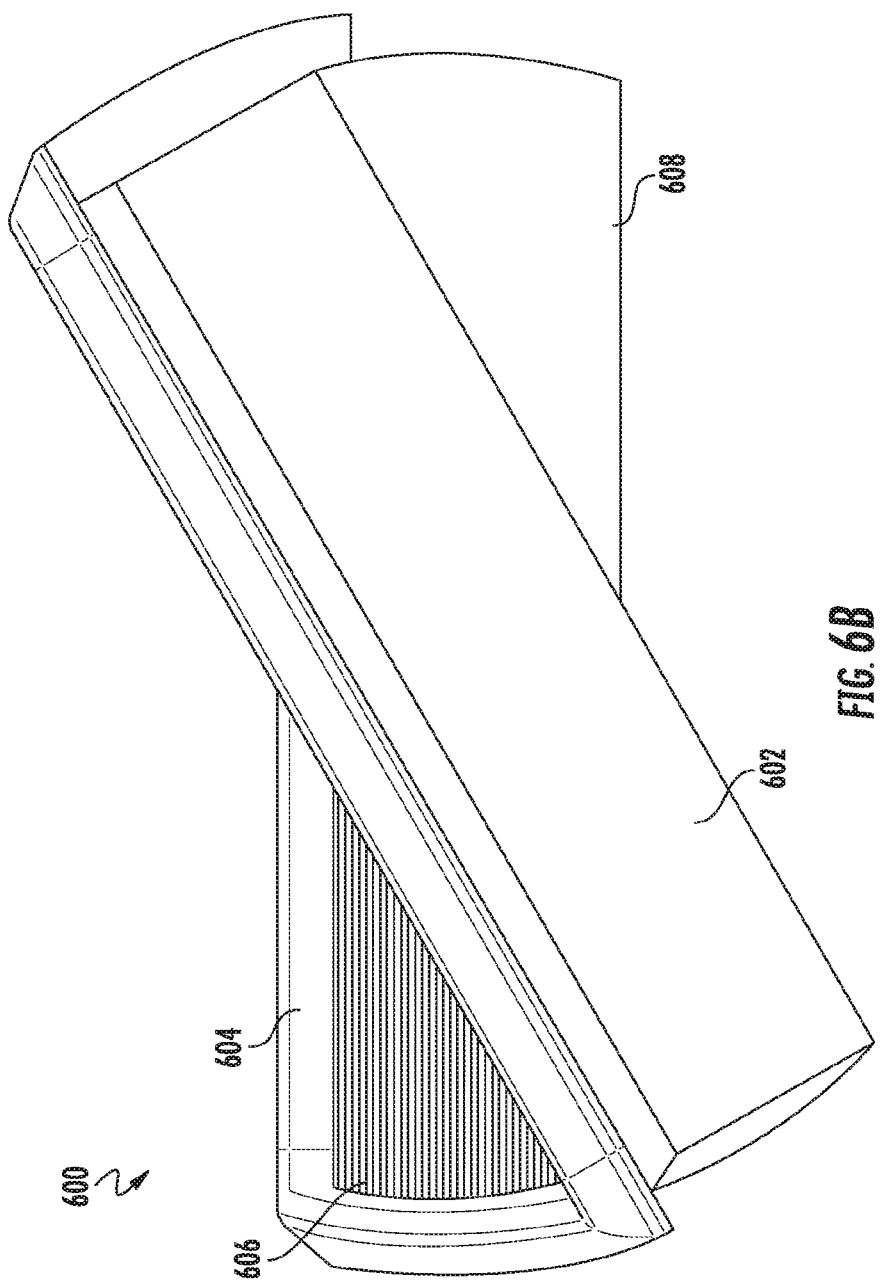
FIG. 6B shows a side view of the filter element of FIG. 6A.

Referring to FIGS. 6A and 6B, views a filter element 600 are shown according to a further example embodiment. FIG. 6A shows a perspective view of the filter element 600. FIG. 6B shows a side view of the filter element 600. The filter element 600 is similar to the filter element 400. The primary difference between the filter element 600 and the filter element 400 is the arrangement of the pleat block. The filter element 600 is a panel filter element. The filter element 600 generally comprises a pleat block 602 and a seal member 604. The pleat block 602 is a pleated filter media pleat block. The pleat block 602 has a first face 606 and a second face 608 opposite the first face 606. In some arrangements, the first face 606 is an inlet face and the second face 608 is an outlet face. In such arrangements, air to be filtered flows into the pleat block 602 through the first face 606, passes through the filter media, and out of the pleat block 602 through the second face 608. In other arrangements, the first face 606 is an outlet face, and the flow through the pleat block 602 is reversed. The filter element 600 is substantially rigid such that the shape of the filter element 600 and the pleat block 102 is maintained. The rigidity may be achieved through the use of a frame or stiffening members. The seal member 604 wraps around the pleat block 602. The seal member 604 may be formed from and/or attached to the pleat block 602 with an adhesive (e.g., polyurethane). The seal member 604 is comprised of a flexible material, such as urethane, and is configured to be compressed against a housing to form a seal against a housing (e.g., as shown described below with respect to FIGS. 6C and 6D).

The pleat block 602 is arranged such that the first face 606 and the second face 608 are non-planar and curved and/or twisted. In the arrangement shown in FIGS. 6A and 6B, the pleat block 602 is curved along two different axes. Accordingly, the seal member 604 is also curved along two different axes. The curvilinear shape of the pleat block 602 helps to reduce restriction in an inlet plenum region compared to a cuboidal pleat block (e.g., the pleat block 102) because the direction of flow into the inlet plenum region is not impeded by a side wall of a filter pleat. Additionally, the pleat direction of the pleat block 602 may be aligned with a flow direction through the filter element 600 to improve dust loading and to reduce restriction as compared to a cuboidal pleat block.

Referring to FIG. 6C, a perspective view of a housing 610 that is configured to receive the filter element 600 is shown according to an example embodiment. FIG. 6D shows an exploded view of the housing 610 and the filter element 600. The housing 610 includes a base section 612 and a cover 614. The cover 614 is removably secured to the base section 612. The base section 612 and the cover 614 define a central compartment 616 that receives the filter element 600. The cover 614 includes an outlet 618, and the base section 612 includes an inlet 620. Accordingly, during filtering operations, fluid (e.g., air) flows into the housing 610 through the inlet 620, into the central compartment 616, through the filter element 600, and out of the housing 610 through the outlet 618. As shown best in FIG. 6D, the base section 612 includes a groove 622 that is curved to match the curves of the seal member 604 of the filter element 600. Accordingly, when the filter element 600 is secured in the housing 610, the seal member 604 forms a seal against the base section 612 by pressing and forming into the groove 622.

Figure 7B:
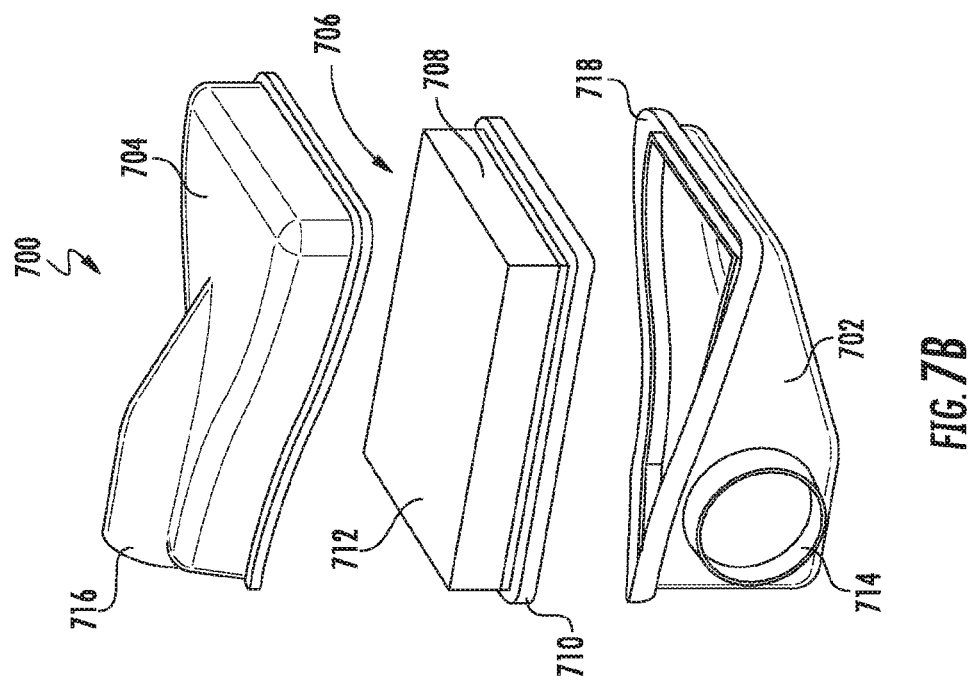
FIGS. 7A and 7B each show a different exploded perspective views of a filtration system are according to an example embodiment.
Figure 7A:
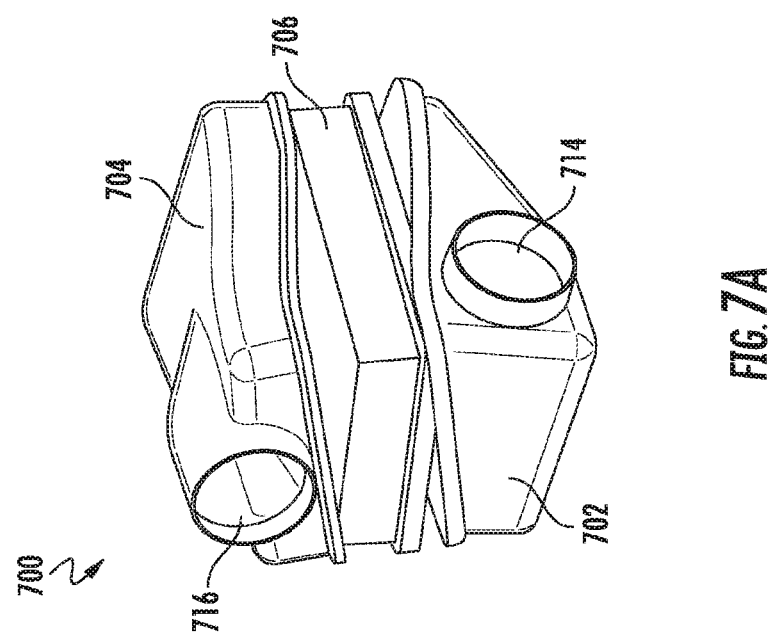

Referring to FIGS. 7A and 7B, two different exploded perspective views of a filtration system 700 are shown according to an example embodiment. The filtration system 700 generally includes a housing having a base section 702 and a cover 704 and a filter element 706 installed in the housing. The base section 702 is removably securable to the cover 704. The arrangement of the filter element 706 is described in further detail below.

The filter element 706 is similar to the filter element 100. Accordingly, the filter element 706 is a panel filter element and includes a pleat block 708 and a seal member 710. In the uninstalled position (e.g., as shown in FIG. 7B when the cover 704 is separated from the base section 702), the pleat block 708 forms a right rectangular cuboid. The pleat block 708 is a pleated filter media pleat block. The pleat block 708 has a first face (not shown, facing the base section 702) and a second face 712 opposite the first face and generally parallel to the second face 712 (in the uninstalled state). In some arrangements, the first face 106 is an inlet face and the second face is an outlet face. In such arrangements, air to be filtered flows into housing through an inlet 714, into the pleat block 708 through the first face, passes through the filter media, out of the pleat block 708 through the second face 712, and out of the housing through an outlet 716. In other arrangements, the first face is an outlet face, and the flow through the pleat block 708 is reversed. Unlike the filter element 100, the filter element 706 is not substantially rigid such that the shape of the filter element 708 can change and conform to the shape of the housing.

The seal member 710 wraps around the pleat block 708 as shown best in FIG. 7B. The seal member 710 may be formed from and/or attached to the pleat block 708 with an adhesive (e.g., polyurethane). The seal member 710 is comprised of a flexible material, such as urethane, and is configured to be compressed against a housing to form a seal against a housing. Each length of the seal member 710 (i.e., the length of the seal member that extends the pleat block length and/or the pleat length) is linear and generally parallel to the respective axis of the Cartesian coordinate system (e.g., as shown in FIG. 1) in the uninstalled state. However, when the filter element 706 is installed in the housing, the filter element 706 changes shape from the right rectangular cuboid to the shape defined by the housing. In changing shape, the seal member 710 also changes shape to match the shape of the housing such that the shape of the seal member 710 matches the shape of a curvilinear sealing surface 718 of the base section 702. In some arrangements, the seal member 710 includes bump-outs to engage with openings in the housing to assist with securing the filter element 706 in place within the housing.

Figure 8A:
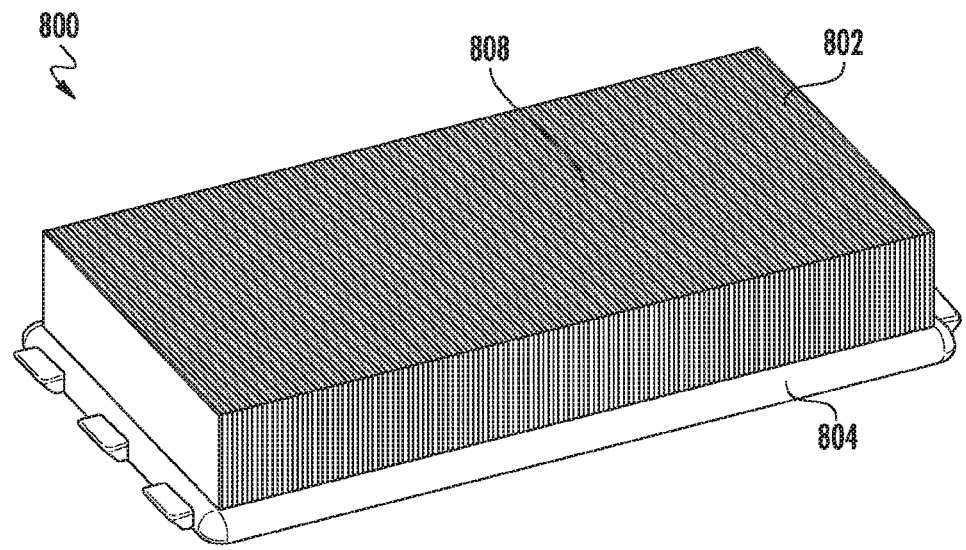
FIGS. 8A and 8B show different perspective views of a filter element according to an example embodiment.
Figure 8B:
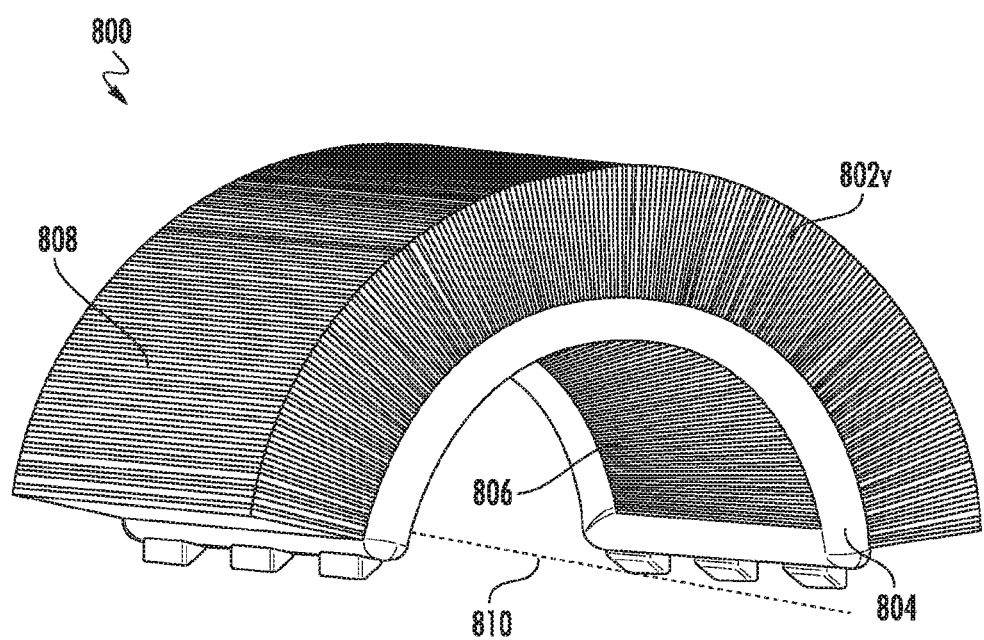

Referring to FIGS. 8A and 8B, views of a filter element 800 are shown according to an example embodiment. FIG. 8A shows a perspective view of the filter element 800 in an uninstalled or flat position. FIG. 8B shows a perspective view of the filter element 800 in an installed or curved position. The filter element 800 is a panel filter element. The filter element 800 generally comprises a pleat block 802 and a seal member 804. The pleat block 802 is a pleated filter media pleat block. In the uninstalled or flat position (FIG. 8A), the filter element 800 has a similar right rectangular cuboid shape as the filter element 100. In the installed or curved position (FIG. 8B) the first face 806 and the second face 808 of the pleat block 802 curved about an axis 810 such that they are non-planar in shape. In some arrangements, the first face 806 is an inlet face and the second face 808 is an outlet face. In such arrangements, air to be filtered flows into the pleat block 802 through the first face 806, passes through the filter media, and out of the pleat block 802 through the second face 808. In other arrangements, the first face 806 is an outlet face, and the flow through the pleat block 802 is reversed. The filter element 800 is flexible (in a similar manner as described above with respect to the filter element 706) such that the filter element 800 can shift from the uninstalled or flat position of FIG. 8A to the installed or curved position of FIG. 8B to match a curvature of a filtration system housing (e.g., as described in further detail below with respect to FIGS. 8C and 8D). In an alternative arrangement, the filter element 800 is substantially rigid and formed to the installed or curved position (of FIG. 8B) such that the shape of the filter element 800 and the pleat block 102 is maintained. In such arrangements, the rigidity may be achieved through the use of a frame or stiffening members.

In the installed or curved position, both the first face 806 and the second face 808 are curved about an axis 810. The curve causes a non-planar shape of both the first face 806 and the second face. The shape of the first face 806 and the second face 808 partially wraps around the axis 810. The axis 810 is parallel to the direction of the folds of the filter media forming the pleats of the filter media of the pleat block 802. The curve of the first face 806 and the second face causes the pleats to fan out more than a cuboid pleat block (e.g., the pleat block of filter elements 100, 200, or 300). The fanning of the pleats improves dust loading characteristics of the filter media of the pleat block 802. In the uninstalled or flat position, both the first face 806 and the second face 808 are substantially planar and parallel. In the uninstalled or flat position, the filter element 800 provides more efficient packaging options and storage.

The seal member 804 wraps around the pleat block 802. The seal member 804 may be formed from and/or attached to the pleat block 802 with an adhesive (e.g., polyurethane). The seal member 804 is comprised of a flexible material, such as urethane, and is configured to be compressed against a housing to form a seal against a housing. Accordingly, the seal member 804 can flex between the uninstalled or flat position and the installed or curved position. The seal member 804 includes locking tabs 812. The locking tabs 812 help secure the filter element 800 in the installed or curved position while in a housing (e.g., as described in further detail below with respect to FIGS. 8C and 8D).

Figure 8C:
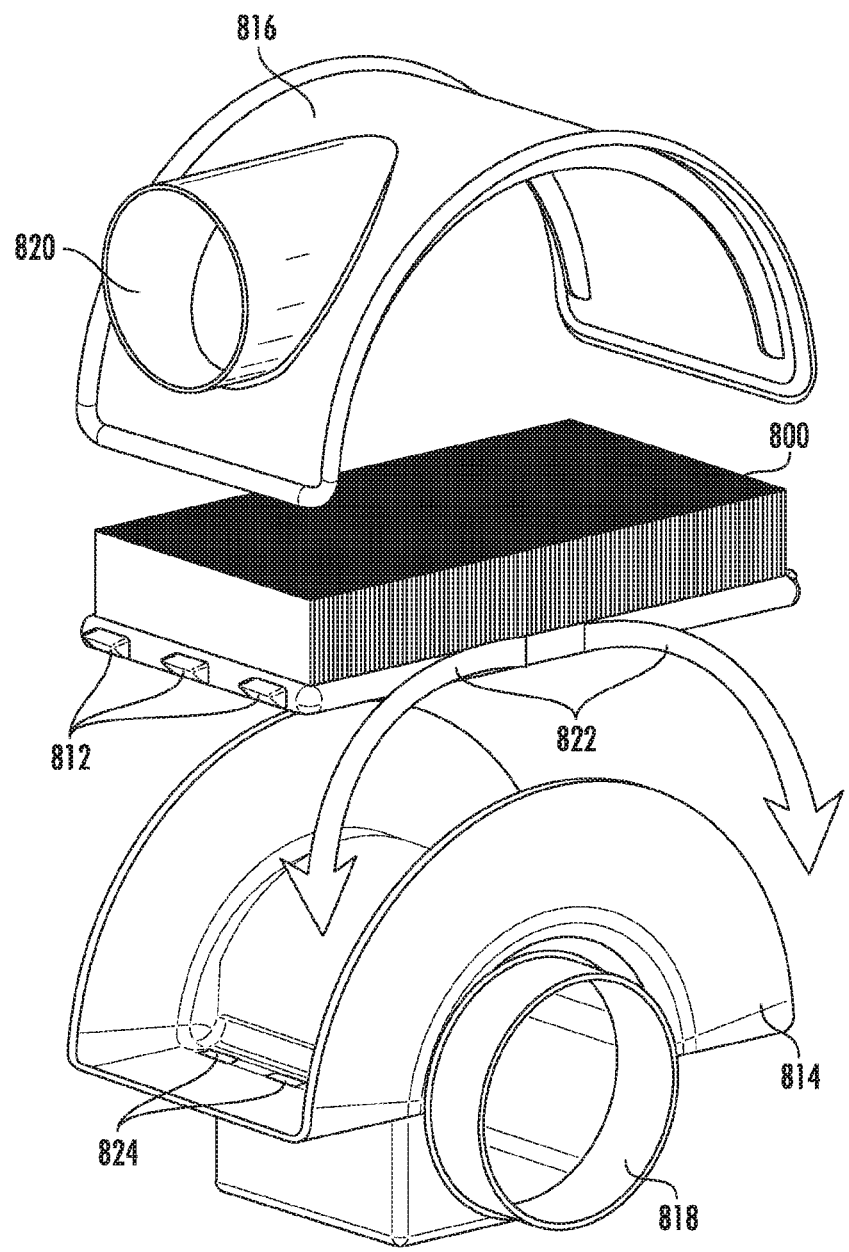
FIGS. 8C and 8D show perspective vies of the filter element of FIGS. 8A and 8B being installed into a housing.
Figure 8D:
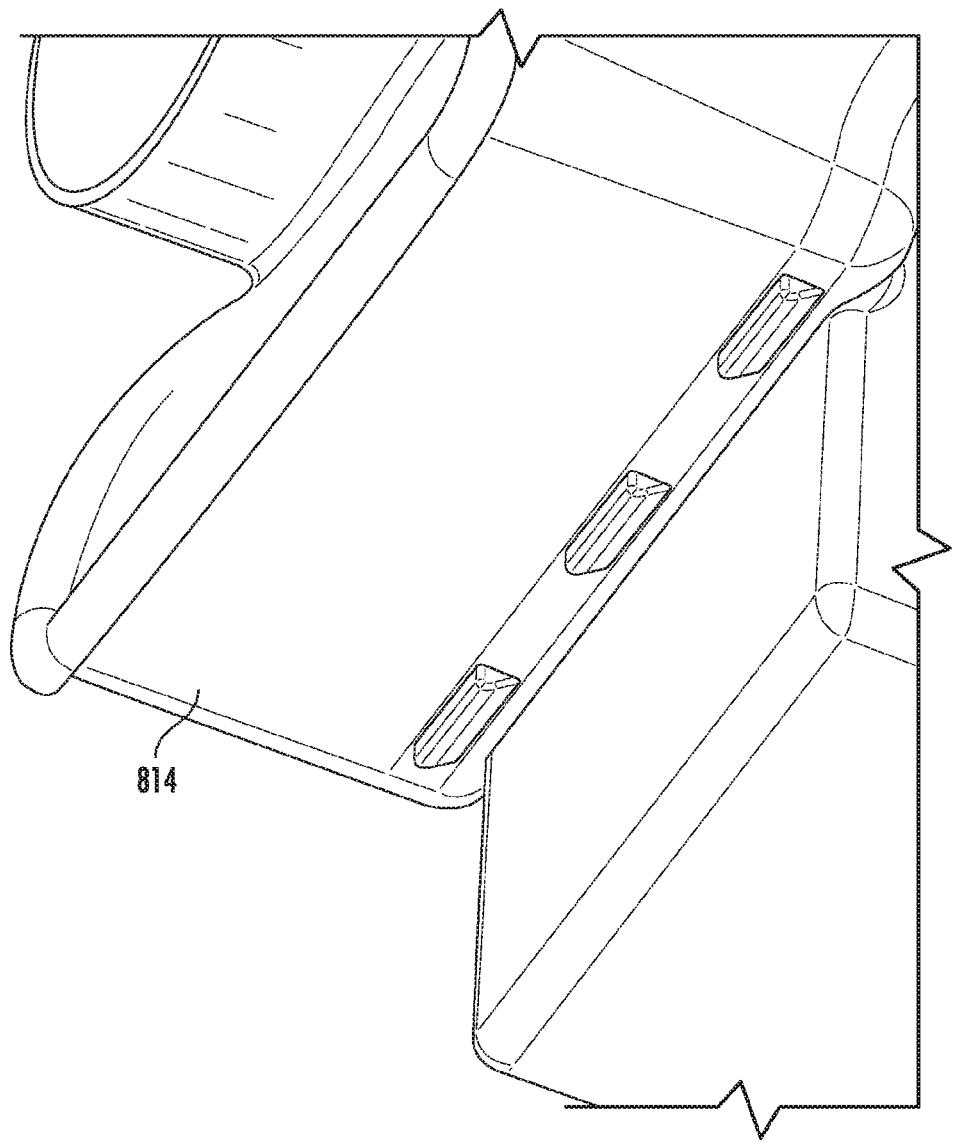

Referring to FIGS. 8C and 8D, perspective views of the filter element 800 being installed in a housing is shown according to an example embodiment. The housing is comprised of a base portion 814 and a lid 816. The lid 816 is configured to be removably attached to the base portion 814. The base portion 814 includes an inlet 818, and the lid 816 includes an outlet 820. As shown in FIG. 8C, the filter element 800 is in the uninstalled or flat position. Accordingly, the filter element 800 needs to bend in the direction of the installation arrows 822 to conform to the shape of the housing base portion 814. The base portion 814 includes sockets 824 configured to receive the locking tabs 812 of the seal member 804. In some arrangements, the sockets 824 form through holes through the base portion 814. When the locking tabs 812 are received in the sockets 824 (as shown in FIG. 8D), the filter element 800 is secured in the base portion 814 in the installed or curved position (of FIG. 8B) and the lid 816 can be secured to the base portion 814 (e.g., via clips or bolts) to complete the installation of the filter element 800 into the housing.

Figure 9B:
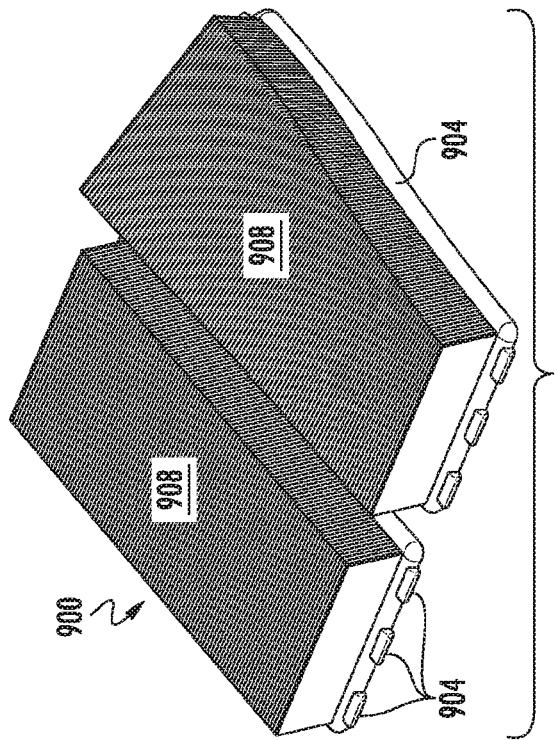
Figure 9D:
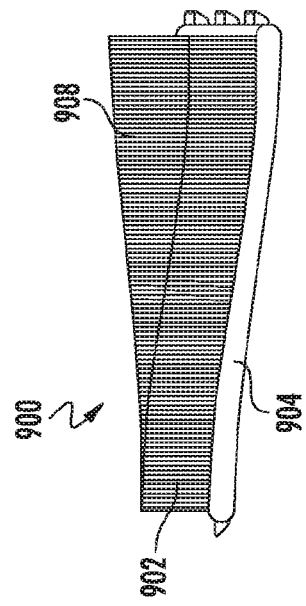
Figure 9A:
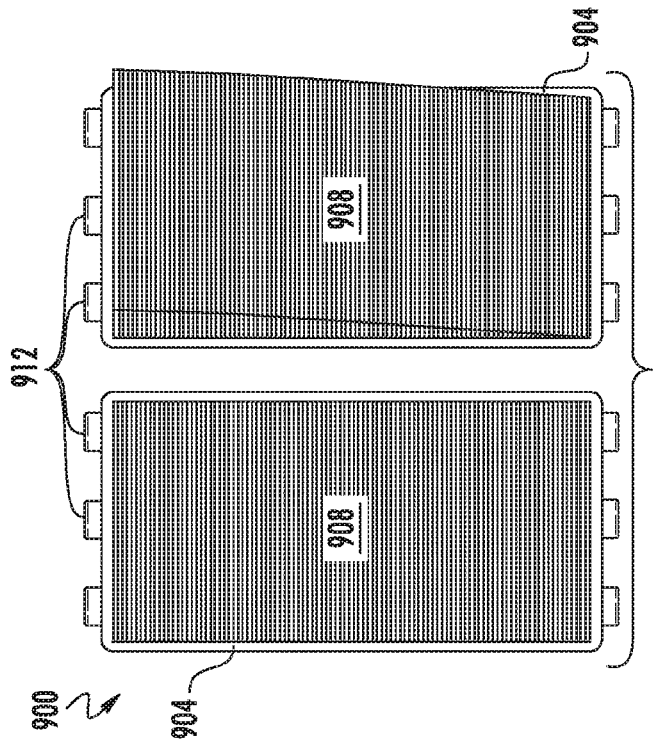
Figure 9C:
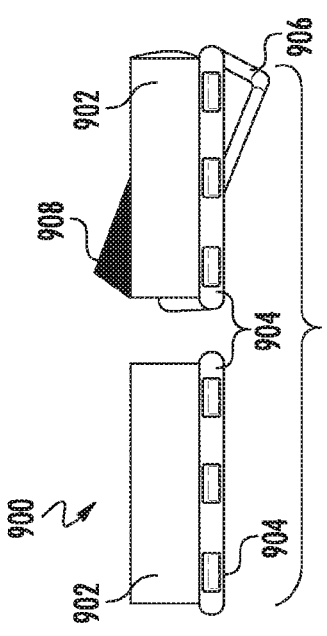

Referring to FIGS. 9A through 9E, views of a filter element 900 changing from a first position to a second position are shown according to another example embodiment. In FIGS. 9A through 9E, the first position is a flat or uninstalled position, and the second position is a curved or installed position. FIG. 9A shows a top view of the filter element 900 in the first position and the second position. FIG. 9B shows a perspective view of the filter element 900 in the first position and the second position. FIG. 9C shows a side view of the filter element 900 in the first position and the second position. FIG. 9D shows another side view of the filter element 900 in the second position. FIG. 9E shows a perspective view of the pleat block 902 of the filter element 900 in the first position and the second position. The filter element 900 is similar to the filter element 800. The primary difference between the filter element 900 and the filter element 800 is the shape of the filter element 900 in the second (i.e., curved or installed) position.

The filter element 900 is a panel filter element. The filter element 900 generally comprises a pleat block 902 and a seal member 904. The pleat block 902 is a pleated filter media pleat block. In the first position, the filter element 900 has a similar right rectangular cuboid shape as the filter element 100. In the second position, the first face 906 and the second face 908 of the pleat block 902 curved and/or twisted such that they are non-planar in shape. In some arrangements, the first face 906 is an inlet face and the second face 908 is an outlet face. In such arrangements, air to be filtered flows into the pleat block 902 through the first face 906, passes through the filter media, and out of the pleat block 902 through the second face 908. In other arrangements, the first face 906 is an outlet face, and the flow through the pleat block 902 is reversed. The filter element 900 is flexible (in a similar manner as described above with respect to the filter element 800) such that the filter element 900 can shift from the first position to the second position to match a curvature of a filtration system housing (e.g., in a similar manner as described above with respect to the filter element 800).

In the second position, both the first face 906 and the second face 908 can be curved and/or twisted depending on the shape of the filter housing receiving the filter element 900. The curve and/or twist causes a non-planar shape of both the first face 906 and the second face 908. In some arrangements, the curve and/or twist of the first face 906 and the second face causes the pleats to fan out more than a cuboid pleat block (e.g., the pleat block of filter elements 100, 200, or 300). In such arrangements, the fanning of the pleats improves dust loading characteristics of the filter media of the pleat block 902. In the first position, both the first face 906 and the second face 908 are substantially planar and parallel. In the first position, the filter element 900 provides more efficient packaging options and storage.

The seal member 904 wraps around the pleat block 902. The seal member 904 may be formed from and/or attached to the pleat block 902 with an adhesive (e.g., polyurethane). The seal member 904 is comprised of a flexible material, such as urethane, and is configured to be compressed against a housing to form a seal against a housing. Accordingly, the seal member 904 can flex between the first and second positions. The seal member 904 includes locking tabs 912. The locking tabs 912 help secure the filter element 900 in the installed or curved position while in a housing (e.g., in a similar manner as described above with respect to the filter element 800 and FIGS. 8C and 8D).

Figure 10A:
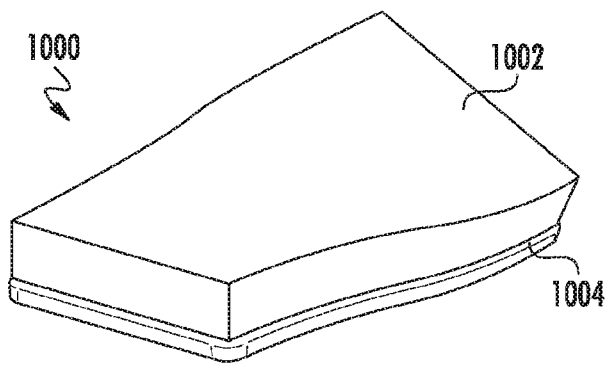
FIGS. 10A, 10B, and 10C, show different ways of adding rigidity to hold a shape of a filter element according to example embodiments.
Figure 10B:
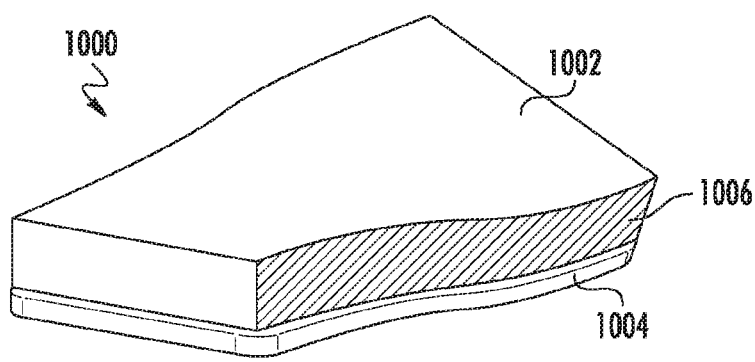
Figure 10C:
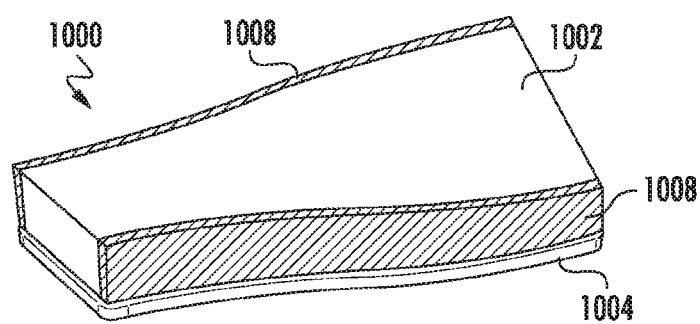

Referring to FIGS. 10A, 10B, and 10C, three different ways of adding rigidity to hold a shape of a filter element are described. The filter element 1000 generally comprises a pleat block 1002 and a seal member 1004 (e.g., similar to the above-described filter elements). Each of FIGS. 10A, 10B, and 10C show perspective views of a filter element 1000 having different features that provide rigidity to the filter element 1000. The stiffening or rigidity features of FIGS. 10A, 10B, and/or 10C may be incorporated into any of the above-described filter elements alone or in combination with each other. The filter element 1000 as shown in FIG. 10A uses a rigid stiff glue to secure the seal member 1004 to the pleat block 1002. The stiff glue helps to maintain the curved and/or twisted shape of the filter element 1000. In some arrangements, the seal member 1004 is comprised of a high durometer urethane such that the seal member 1004 itself also maintains the curved and/or twisted shape of the filter element 1000. The filter element 1000 of FIG. 10B includes at least one side 1006 of the pleat block 1002 that is sprayed with a semi-rigid material, such as polyurethane, poly urea spray (e.g., BASF® Elastocast® 55090), or the like, which provides rigidity to maintain the curved and/or twisted shape of the filter element 1000. Any number of sides of the pleat block 1002 can be sprayed with the semi-rigid material (e.g., one side, two sides, three sides, four sides, etc.). The filter element 1000 of FIG. 10C includes semi-rigid panels 1008 secured to two sides of the pleat block 1002 that maintain the curved and/or twisted shape of the filter element 1000. The panels 1008 may be formed from injection molded plastic, rigid cardboard, die cute sheets, metal, rubber, or the like. Although shown as including two panels 1008 in FIG. 10C, any number of panels 1008 can be used on any number of sides of the pleat block 1002.

Figure 11A:
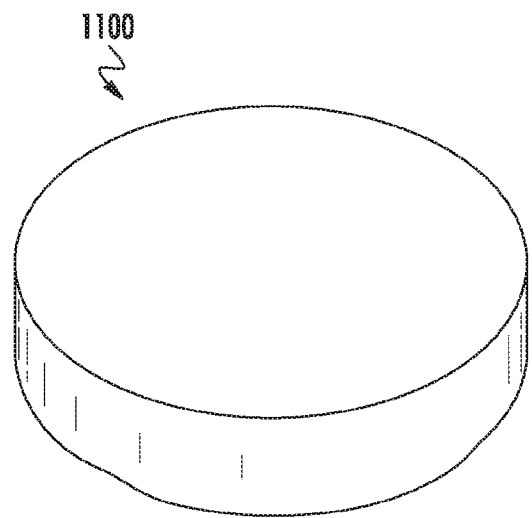
FIGS. 11A and 11B each show a perspective view of a round pleat block according to an example embodiment.
Figure 11B:
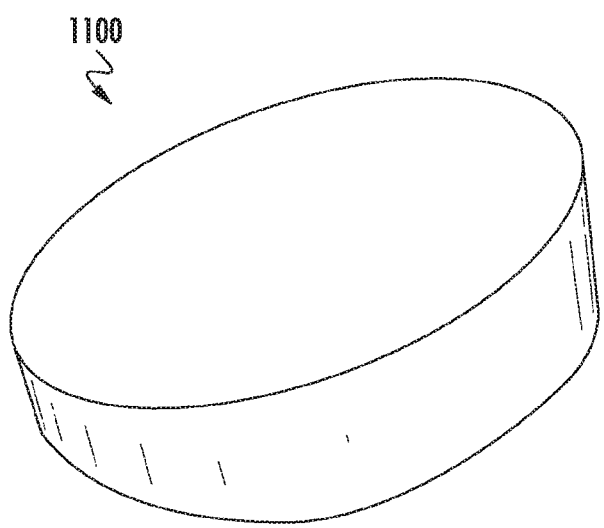
Figure 12A:
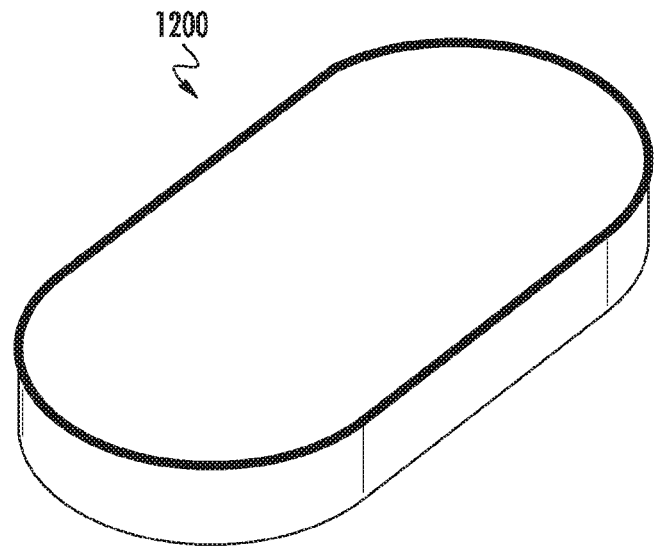
FIGS. 12A and 12B each show a perspective view of an oval or racetrack pleat block according to an example embodiment.
Figure 12B:
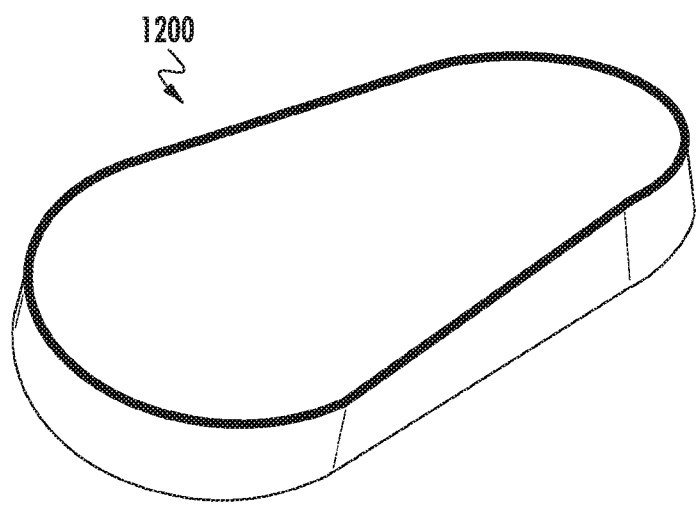
Figure 13A:
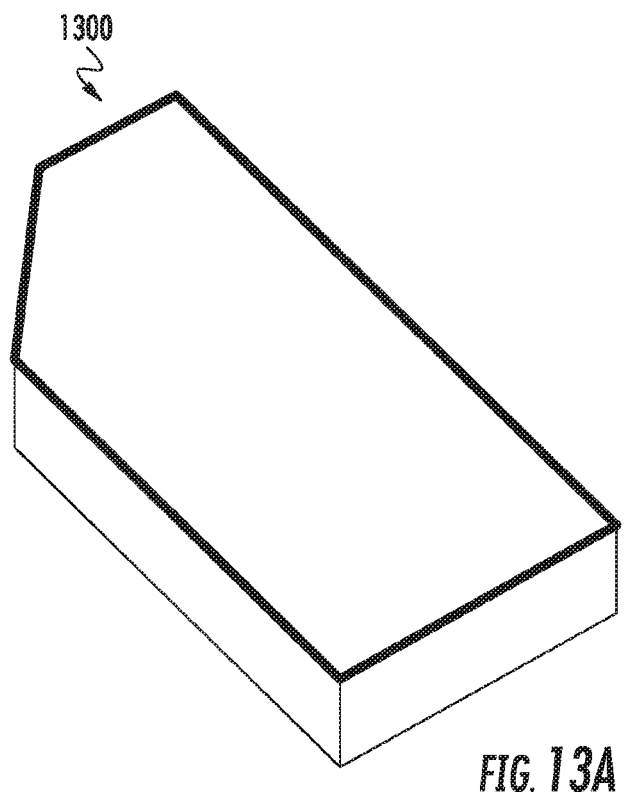
FIGS. 13A and 13B each show a perspective view of a multi-sided pleat block according to an example embodiment.
Figure 13B:
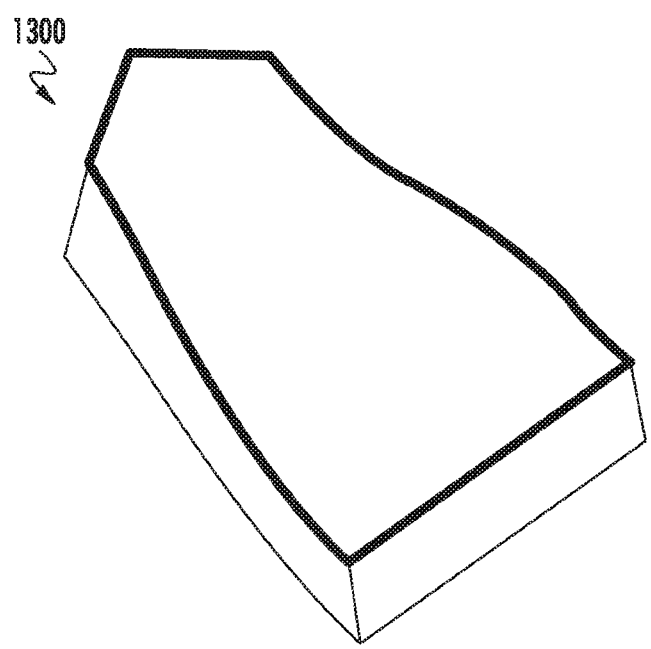

FIGS. 11A, 11B, 12A, 12B, 13A, and 13B show different shapes of pleat blocks in a flat (i.e., uninstalled) position (as shown in the respective FIG. "A") and a curved and/or twisted (i e, installed) position (as shown in the respective FIG. "B") according to various embodiments. FIGS. 11A and 11B each show a perspective view of a round pleat block 1100. FIGS. 12A and 12B each show a perspective view of an oval or racetrack pleat block 1200. FIGS. 13A and 13B each show a perspective view of a five-sided pleat block 1300.

Figure 14:
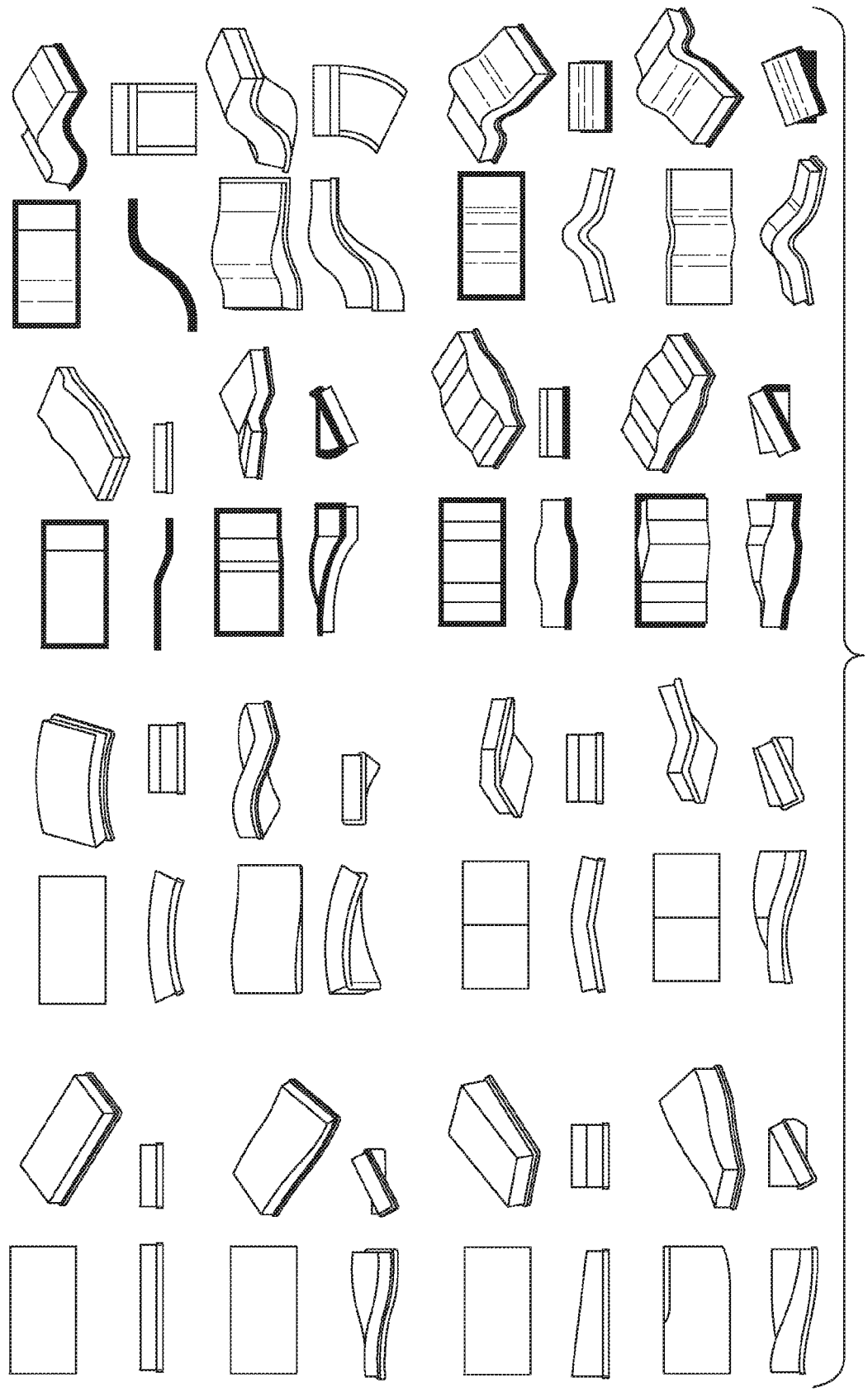
FIG. 14 shows various views of different shaped filter elements according to various example embodiments.

Referring to FIG. 14, various views of different shaped filter elements are shown according to example embodiments.

Each of the above-described filter elements generally includes a pleat block and a seal member. The seal members can be formed to have a variety of cross-sectional shapes depending on the intended filtration system. As described in further detail below, FIGS. 15A through 15D show an arrangement having a flat seal member 1504, and FIGS. 16A through 16D show an arrangement having a round seal member 1604. The flat seal member 1504 and the round seal member 1604 may be used with any of the above-described filter elements. In some embodiments, in a manufacturing process of the pleat block and the seal member, the seal member is added after the filter media is formed into a twisted curvilinear shape. In this way, force vectors of compression are normalized to the projected sealing surface. As such, the filter housing and cover may seal together easily.

Figure 15A:
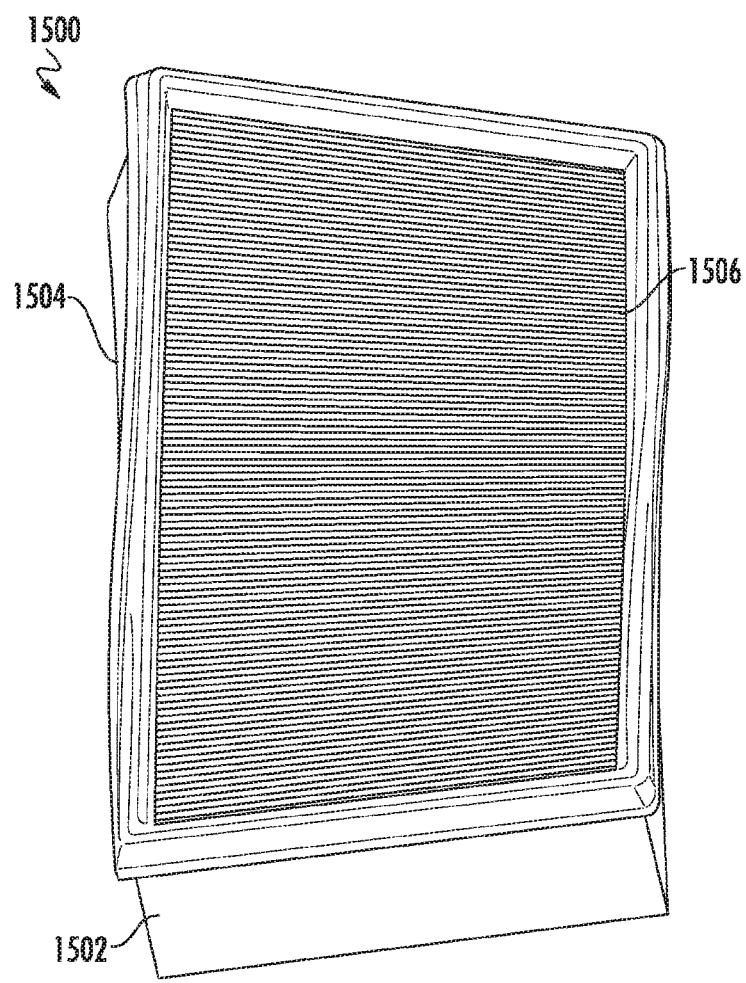
FIGS. 15A, 15B, 15C, and 15D show different views of a flat sided seal member for a filter element according to an example embodiment.
Figure 15B:
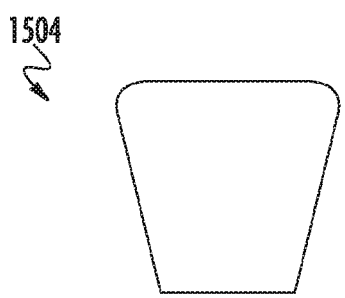
Figure 15C:
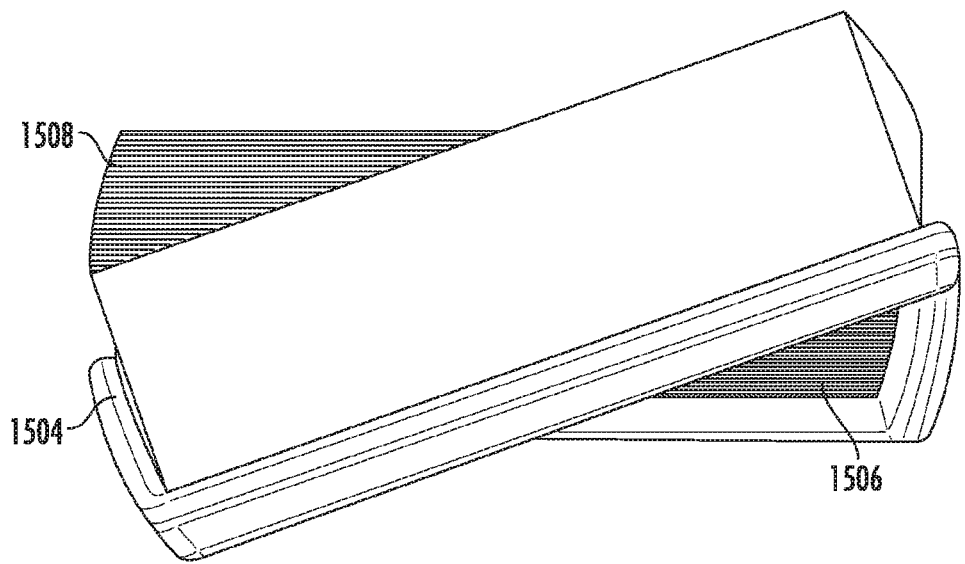
Figure 15D:
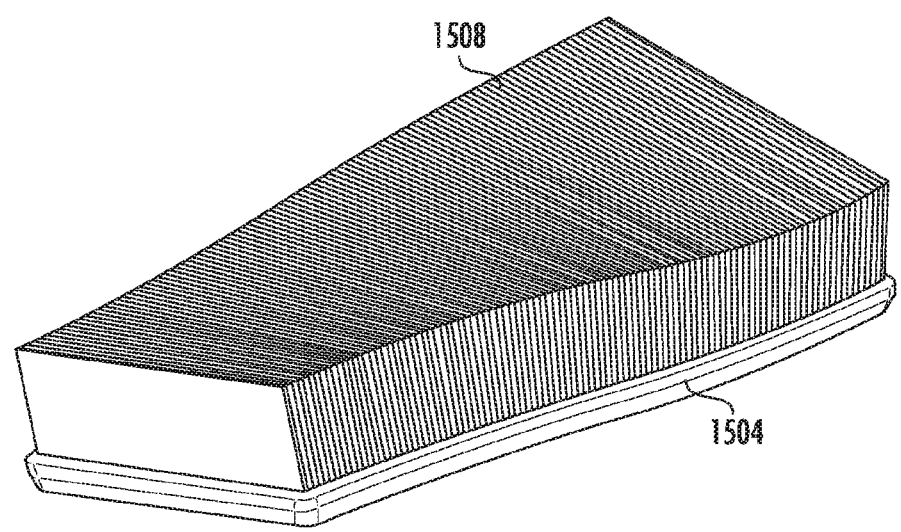

Referring to FIGS. 15A through 15D, views of a filter element 1500 having a flat seal member 1504 are shown according to an example embodiment. FIGS. 15A, 15C, and 15D each show a different perspective view of the filter element 1500. FIG. 15B shows a cross-sectional view of the seal member 1504. The filter element 1500 is similar to the filter element 600. The filter element 1500 is a panel filter element. The filter element 1500 generally comprises a pleat block 1502 and a seal member 1504. The pleat block 1502 is a pleated filter media pleat block. The pleat block 1502 has a first face 1506 and a second face 1508 opposite the first face 1506. In some arrangements, the first face 1506 is an inlet face and the second face 1508 is an outlet face. In such arrangements, air to be filtered flows into the pleat block 1502 through the first face 1506, passes through the filter media, and out of the pleat block 1502 through the second face 1508. In other arrangements, the first face 1506 is an outlet face, and the flow through the pleat block 1502 is reversed. In some arrangements, the filter element 1500 is substantially rigid such that the shape of the filter element 1500 and the pleat block 102 is maintained. The rigidity may be achieved through the use of a frame or stiffening members. The seal member 1504 wraps around the pleat block 1502. The seal member 1504 may be attached to the pleat block 1502 with an adhesive (e.g., hot melt adhesive) or through a compressive press fit. The seal member 1504 is comprised of a flexible material, such as urethane, and is configured to be compressed against a housing to form a seal against a housing.

The pleat block 1502 is arranged such that the first face 1506 and the second face 1508 are non-planar and curved and/or twisted. Accordingly, the seal member 1504 is also curved and/or twisted to match the shape of the pleat block 1502. The curvilinear shape of the pleat block 1502 helps to reduce restriction in an inlet plenum region compared to a cuboidal pleat block (e.g., the pleat block 102). Additionally, the pleat direction of the pleat block 1502 may be aligned with a flow direction through the filter element 1500 to improve dust loading and to reduce restriction as compared to a cuboidal pleat block.

As shown best in FIG. 15B, the seal member 1504 has an overall trapezoidal cross-sectional shape having flat sides. The flat sides are configured to seal against a portion of a filtration system housing when the filter element 1500 is installed in the housing. The flat sides form a twisted ribbon surface interface between the seal member 1504 and the housing. As shown in FIG. 15B, at least some of the vertices connecting the flat sides may be rounded.

Figure 16A:
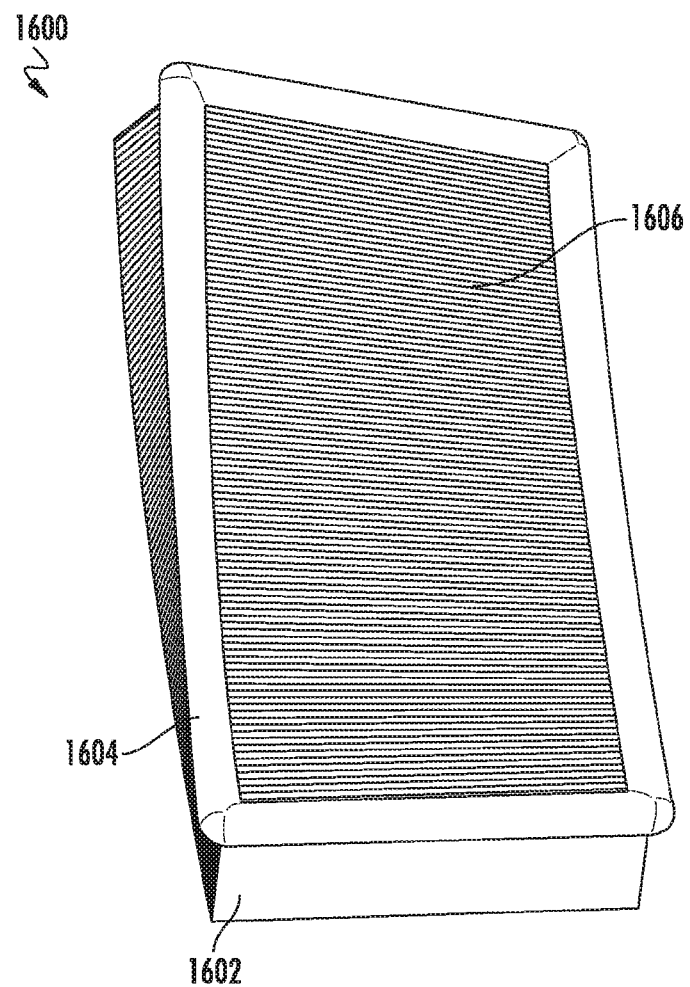
FIGS. 16A, 16B, 16C, and 16D show different views of a round seal member for a filter element.
Figure 16B:
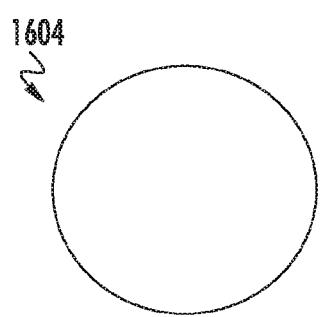
Figure 16C:
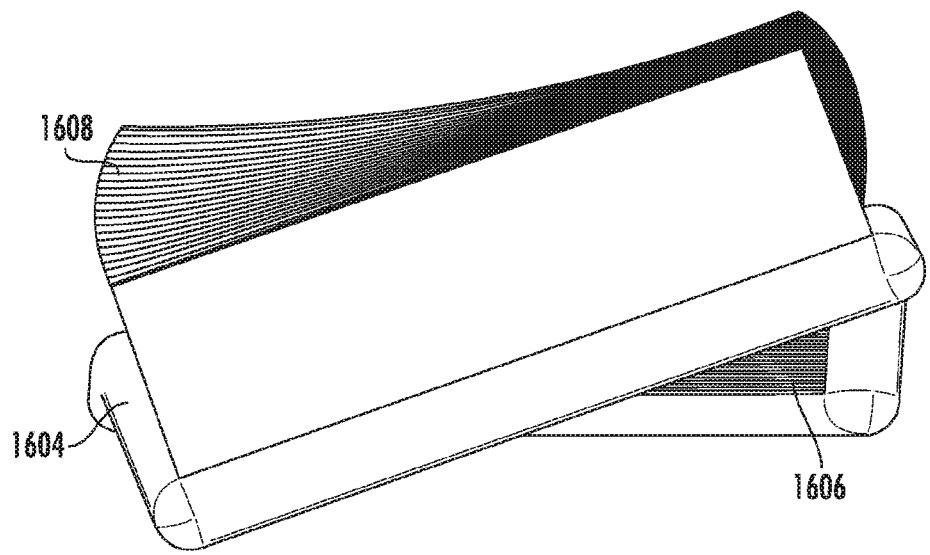
Figure 16D:
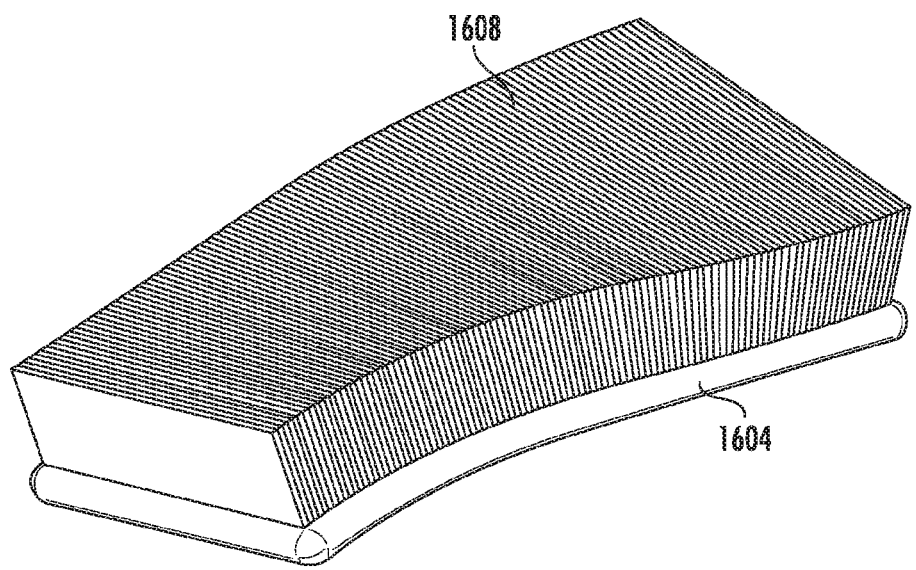
Figure 17A:
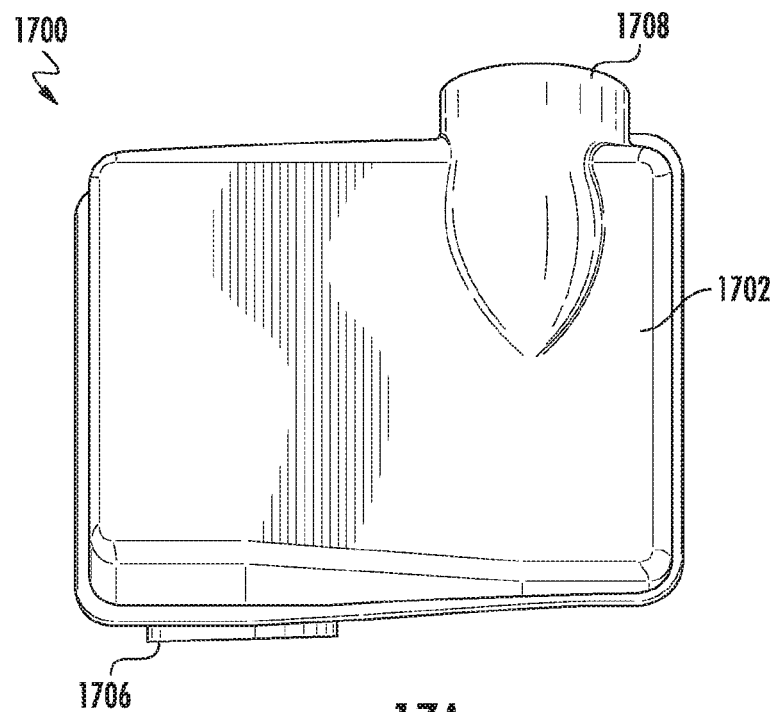
FIGS. 17A-17G show various view of a filter housing configured to house a curved panel filter according to another embodiment.
Figure 17B:
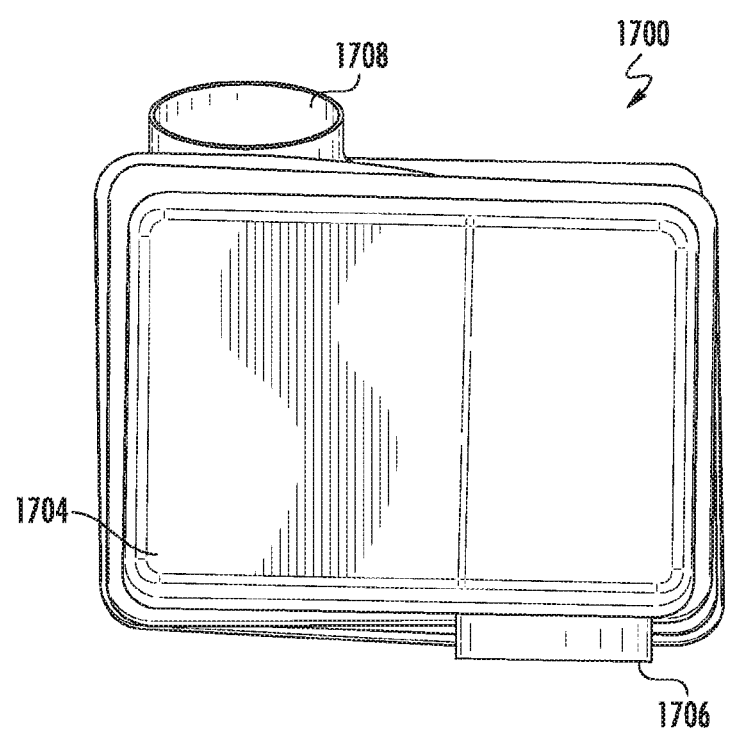
Figure 17C:
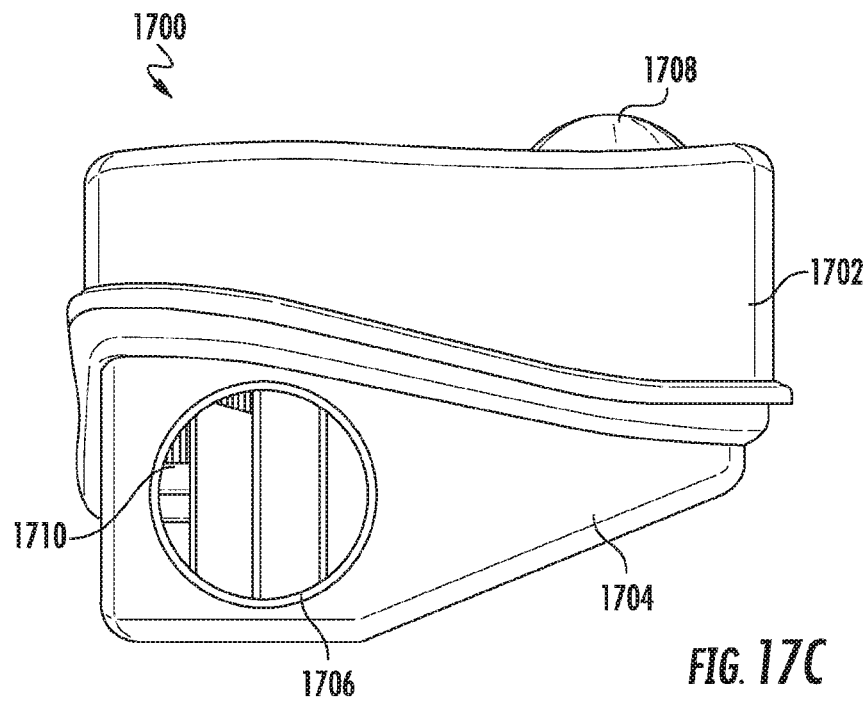
Figure 17D:
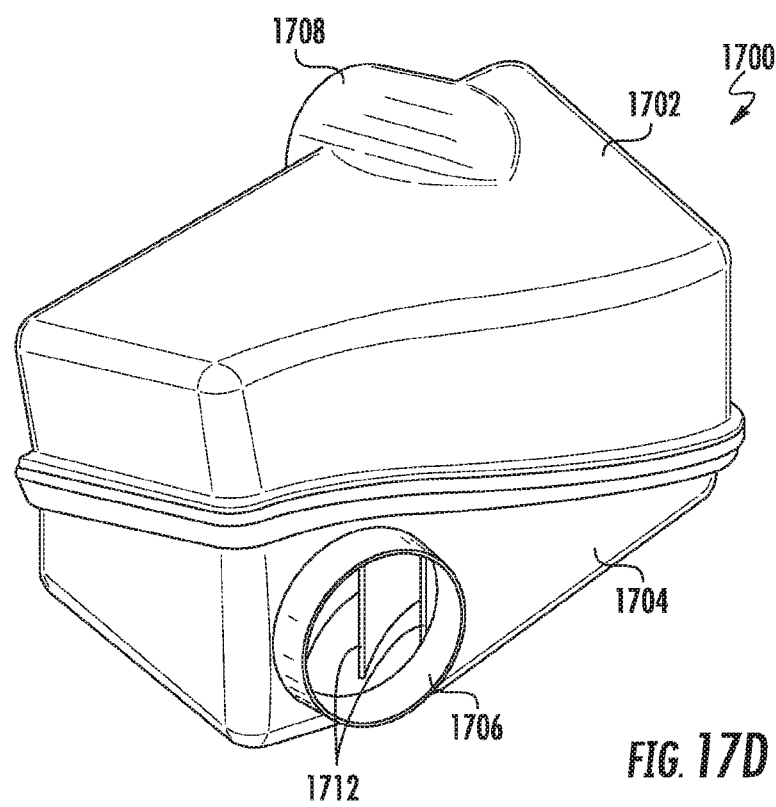
Figure 17E:
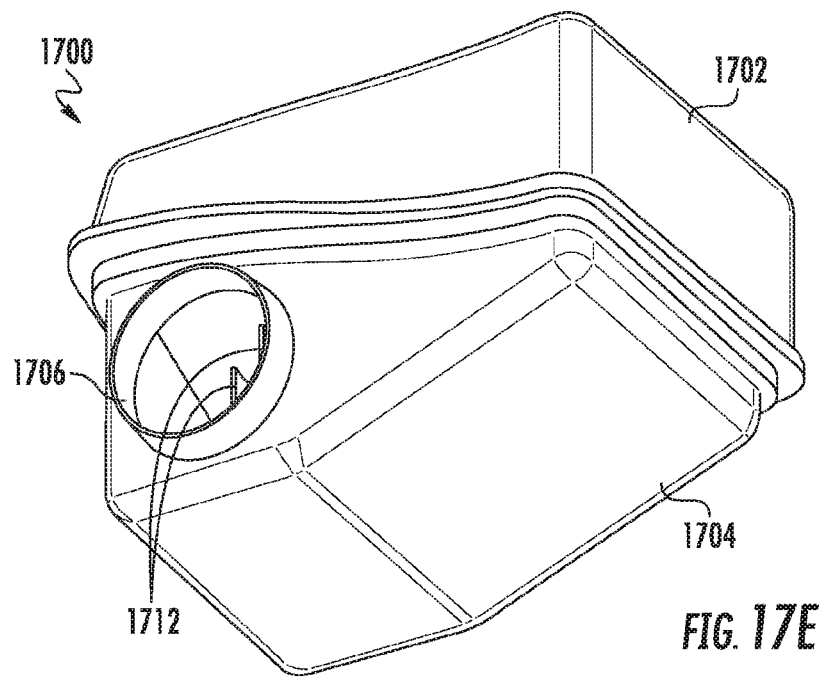
Figure 17F:
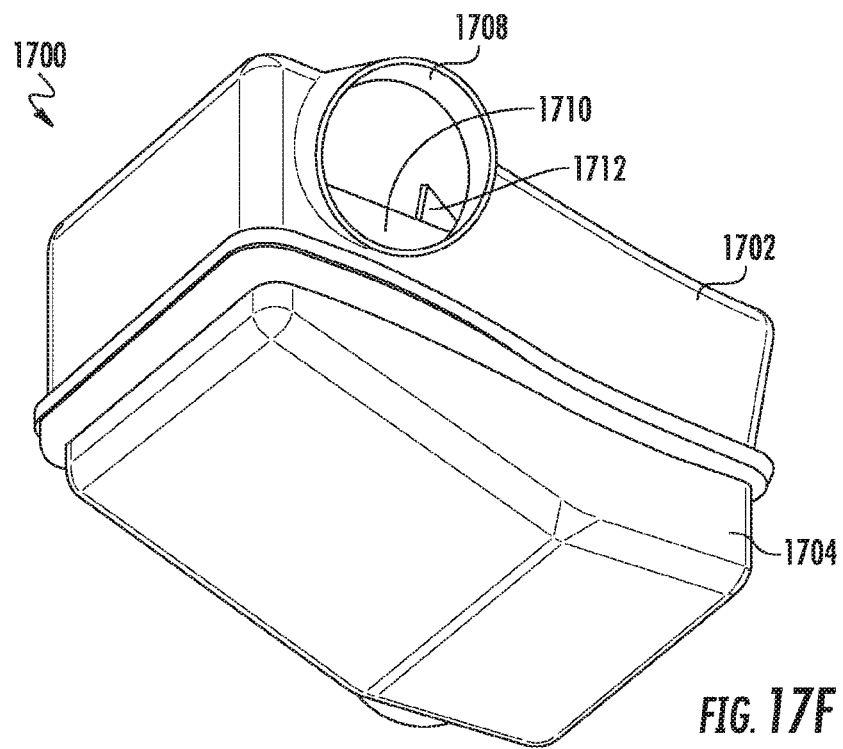
Figure 17G:
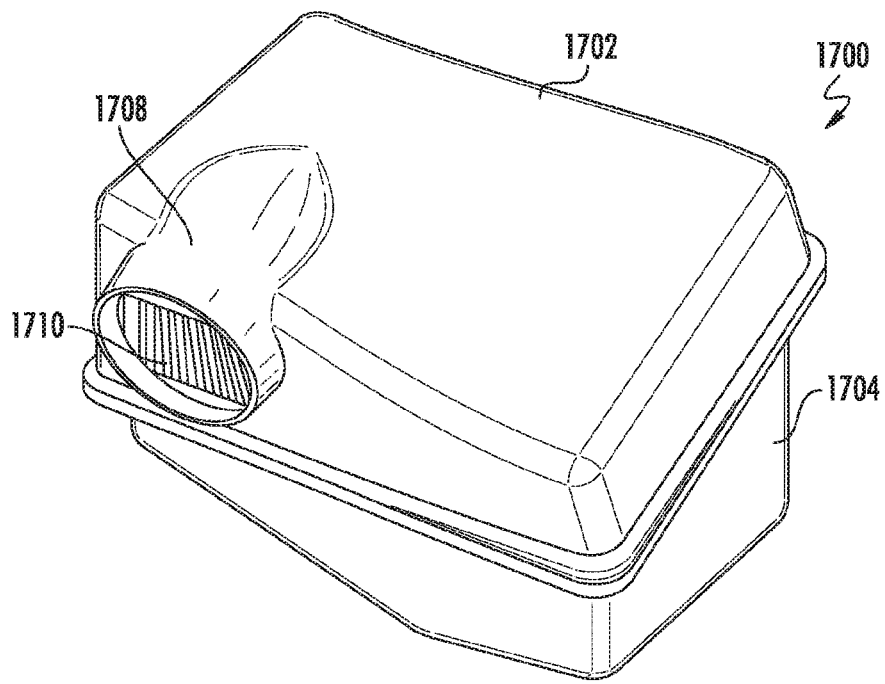
Figure 17H:
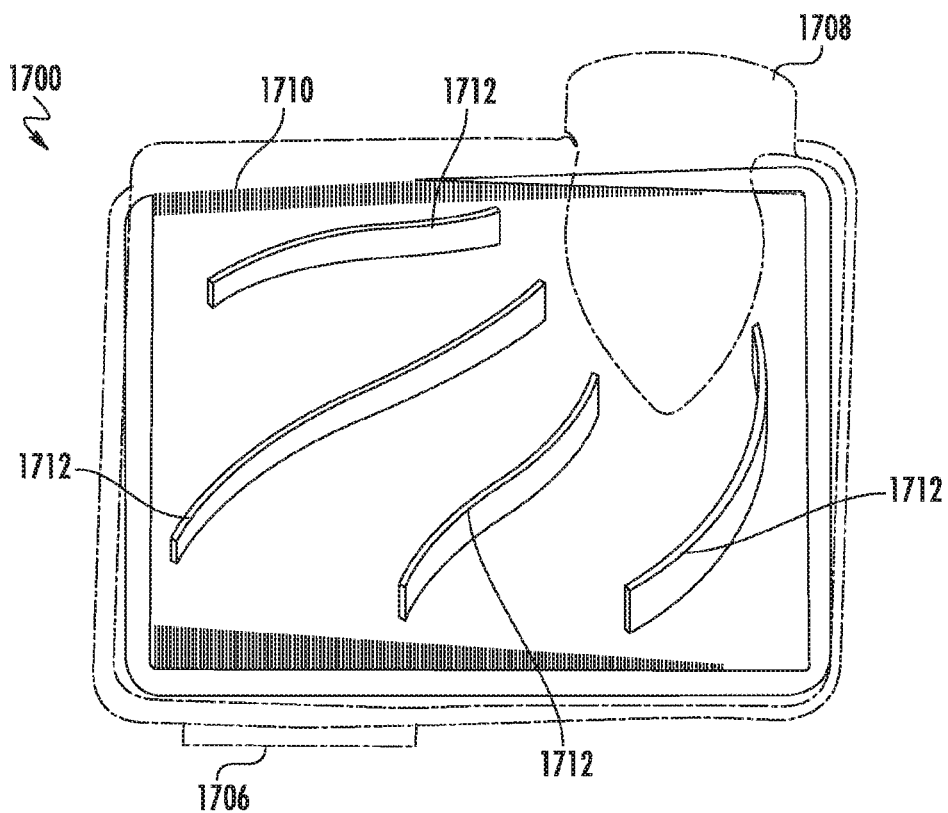
FIG. 17H is a top cross-sectional view of the filter housing of FIGS. 17A-G, showing the flow of fluid through the panel filter and the filter housing.
Figure 17I:
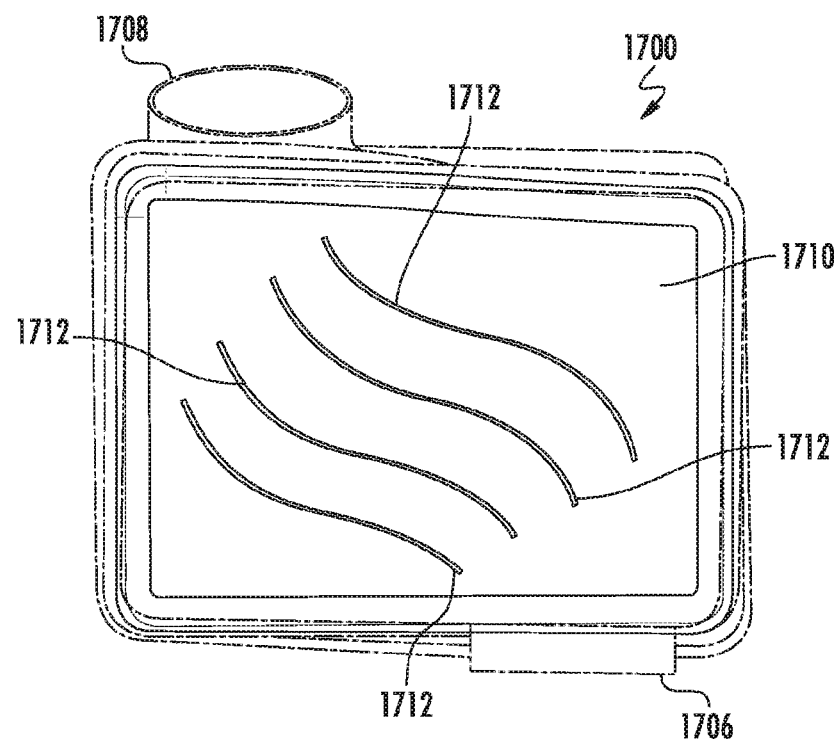
FIG. 17I is a bottom cross-sectional view of the filter housing of FIGS. 17A-G, showing the flow of fluid through the panel filter and the filter housing.
Figure 17J:
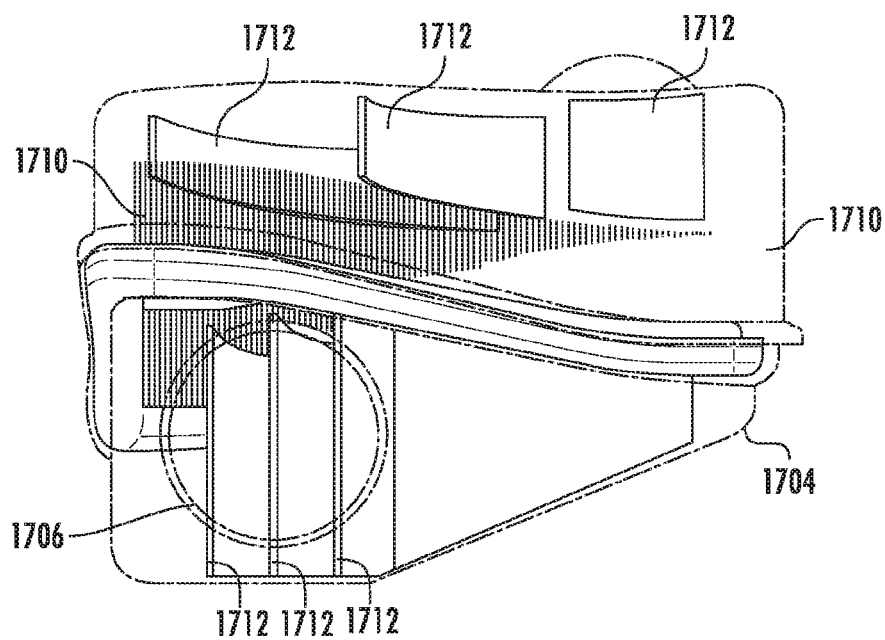
FIG. 17J is a front cross-sectional view of the filter housing of FIGS. 17A-G.
Figure 17K:
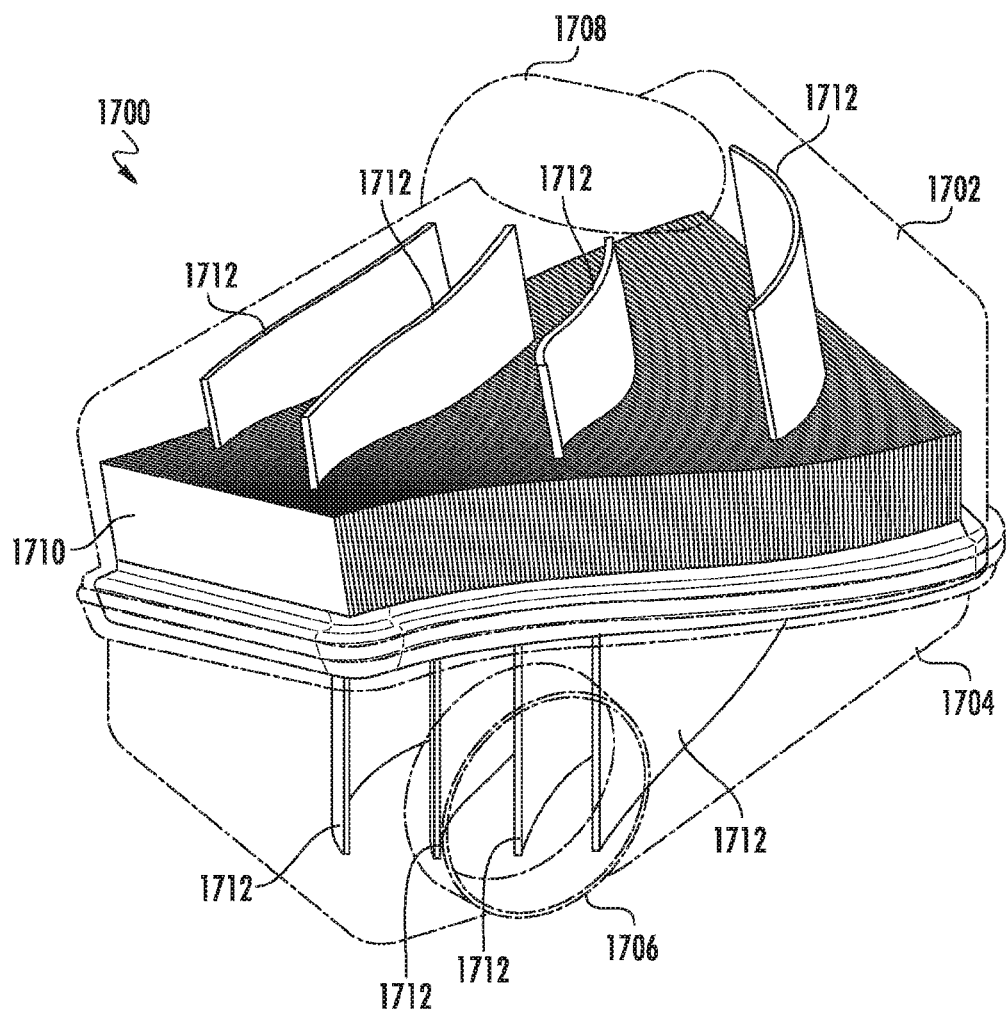
FIG. 17K-17L are front isometric cross-sectional views of the filter housing of FIGS. 17A-17G.
Figure 17L:
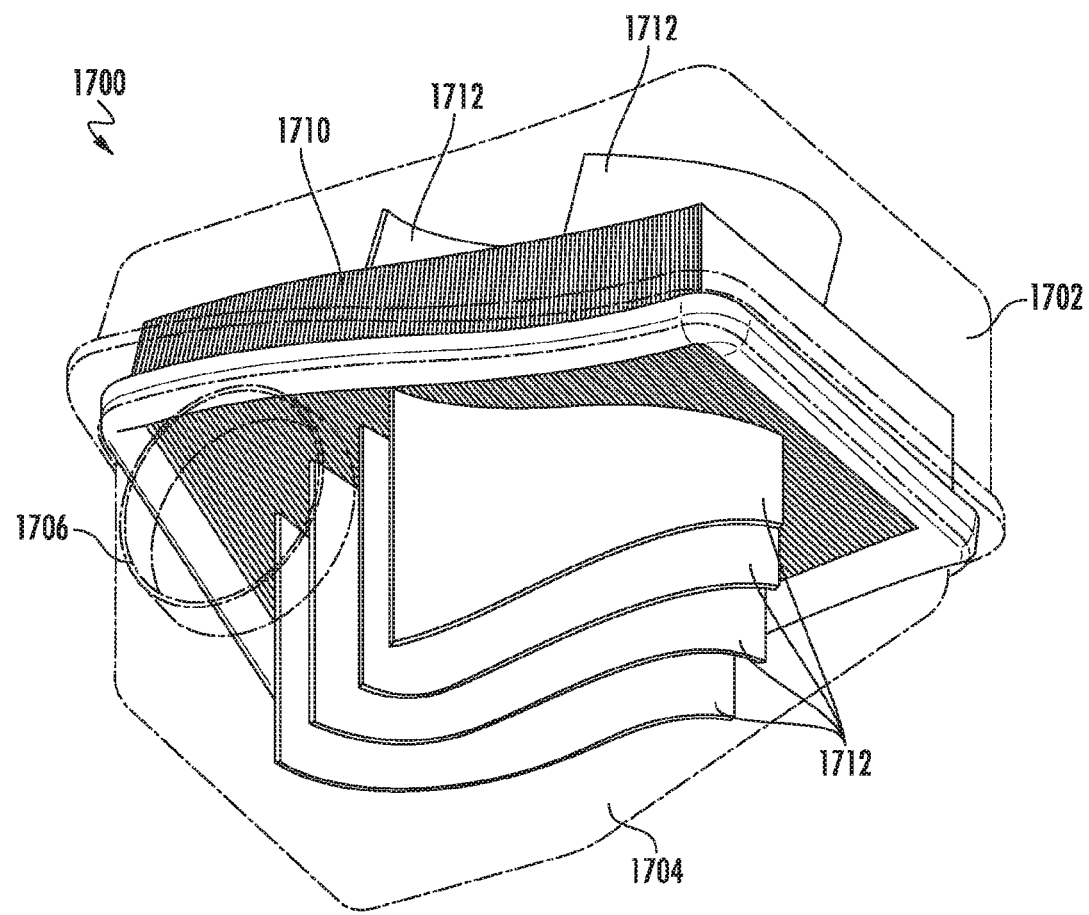
Figure 17M:
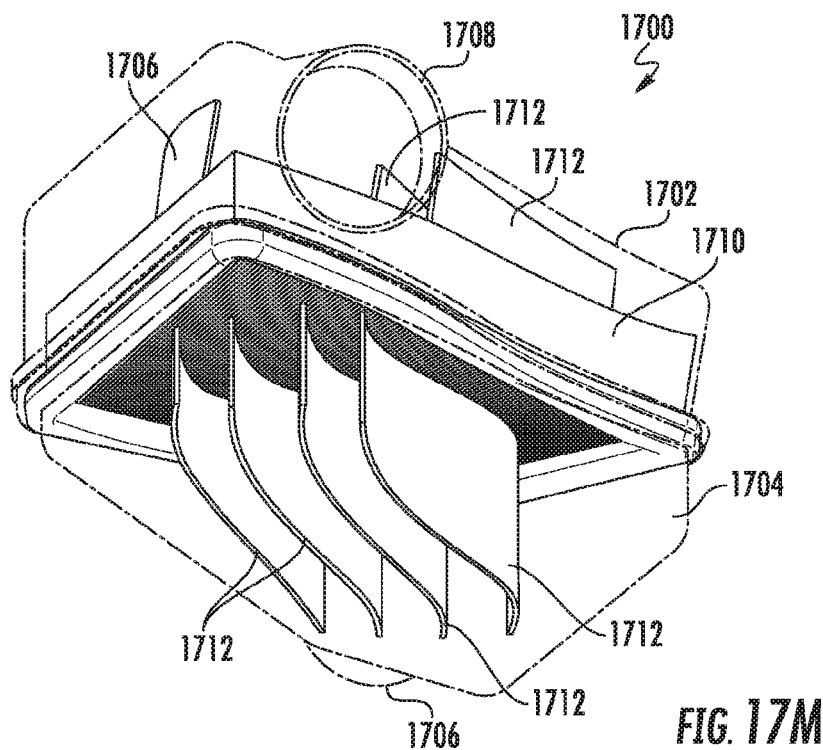
FIG. 17M-17N are rear isometric cross-sectional views of the filter housing of FIGS. 17A-17G.
Figure 17N:
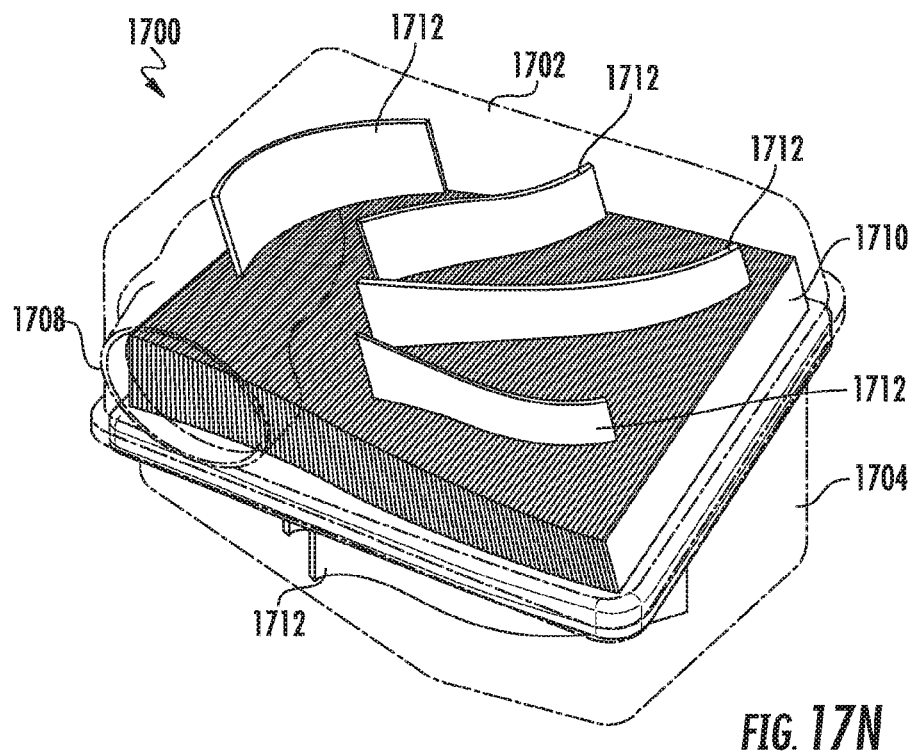
Figure 17O:
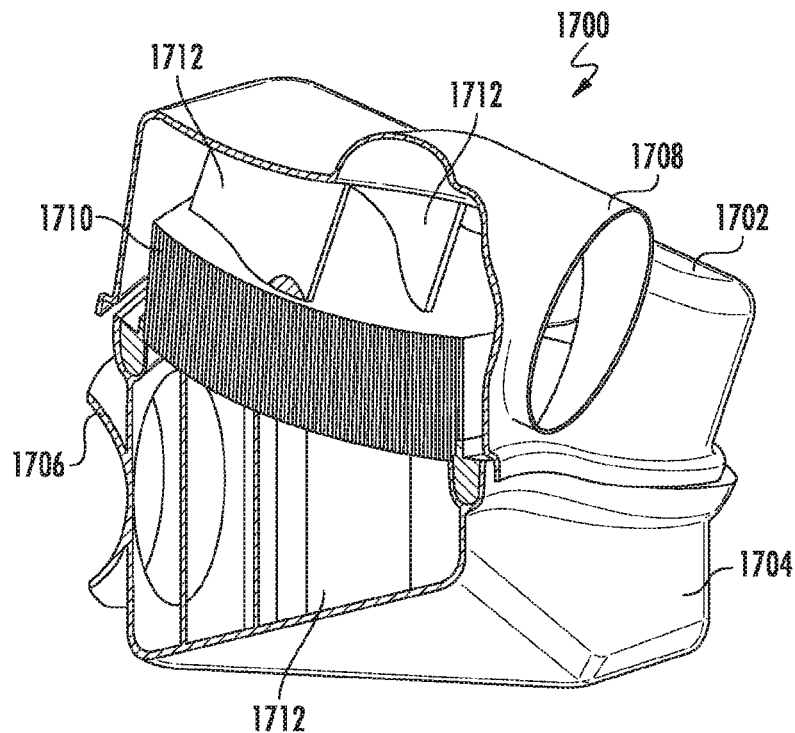
FIG. 17O-17P are isometric views of the filter housing of FIGS. 17A-17G, with a panel filter therein and with the filter housing in a partially disassembled state.
Figure 17P:
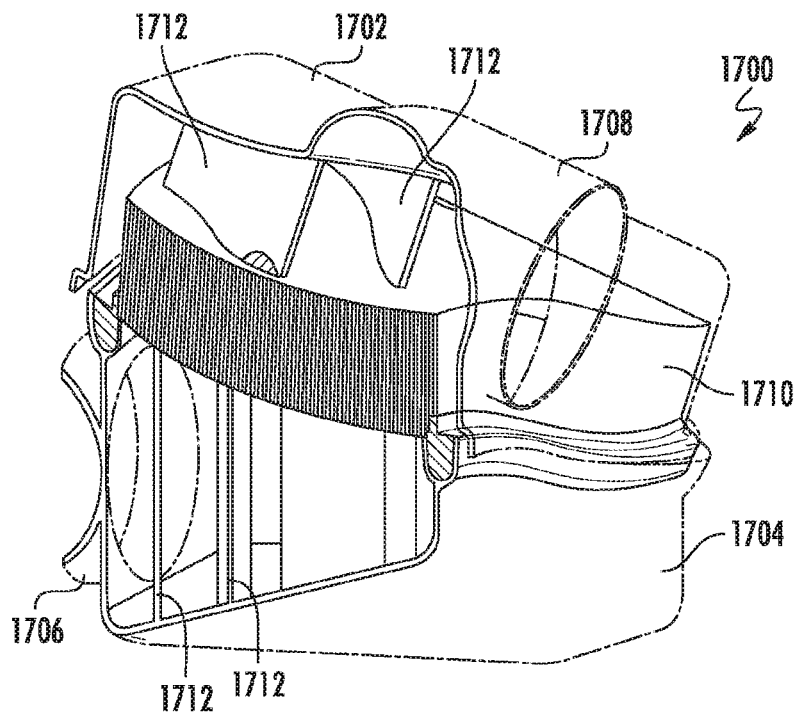

Referring to FIGS. 16A through 16D, views of a filter element 1600 having a flat seal member 1600 are shown according to an example embodiment. FIGS. 16A, 16C, and 16D each show a different perspective view of the filter element 1600. FIG. 16B shows a cross-sectional view of the seal member 1604. The filter element 1600 is similar to the filter element 600 and the filter element 1500. The filter element 1600 is a panel filter element. The filter element 1600 generally comprises a pleat block 1602 and a seal member 1604. The pleat block 1602 is a pleated filter media pleat block. The pleat block 1602 has a first face 1606 and a second face 1608 opposite the first face 1606. In some arrangements, the first face 1606 is an inlet face and the second face 1608 is an outlet face. In such arrangements, air to be filtered flows into the pleat block 1602 through the first face 1606, passes through the filter media, and out of the pleat block 1602 through the second face 1608. In other arrangements, the first face 1606 is an outlet face, and the flow through the pleat block 1602 is reversed. In some arrangements, the filter element 1600 is substantially rigid such that the shape of the filter element 1600 and the pleat block 102 is maintained. The rigidity may be achieved through the use of a frame or stiffening members. The seal member 1604 wraps around the pleat block 1602. The seal member 1604 may be attached to the pleat block 1602 with an adhesive (e.g., hot melt adhesive) or through a compressive press fit. The seal member 1604 is comprised of a flexible material, such as urethane, and is configured to be compressed against a housing to form a seal against a housing.

The pleat block 1602 is arranged such that the first face 1606 and the second face 1608 are non-planar and curved and/or twisted. Accordingly, the seal member 1604 is also curved and/or twisted to match the shape of the pleat block 1602. The curvilinear shape of the pleat block 1602 helps to reduce restriction in an inlet plenum region compared to a cuboidal pleat block (e.g., the pleat block 102). Additionally, the pleat direction of the pleat block 1602 may be aligned with a flow direction through the filter element 1600 to improve dust loading and to reduce restriction as compared to a cuboidal pleat block.

As shown best in FIG. 16B, the seal member 1604 has an overall circular cross-sectional shape. The round edges of the seal member 1604 are configured to seal against a portion of a filtration system housing when the filter element 1600 is installed in the housing. The seal member 1604 forms a circular seal surface.

FIGS. 17A-17G show various view of a filter housing 1700 configured to house a filter element (shown in the form of a curved panel filter) according to another embodiment. The filter housing 1700 includes an upper filter housing portion 1702 in engagement with a lower housing portion 1704. "Dirty" fluid (such as unfiltered air) enters the filter housing 1700 via a fluid inlet 1706, and filtered fluid exits the filter housing via a fluid outlet 1708 (the fluid inlet 1706 and the fluid outlet 1708 can be reversed in accordance with particular system requirements).

FIGS. 17H-17P show different views of a filter element 1710 positioned within the filter housing 1700 (with selected views showing various portions of the filter housing 1700 in a translucent form). The filter element 1710 can take the form of the various filter elements described herein, depending upon system requirements and the configuration of the filter housing 1700. The seal member may be located at either top or the bottom of the filter element 1710, pursuant to system specifications and requirements.

One or more projections may extend from the upper housing portion 1702 and/or the lower housing portion 1704. FIGS. 17H-17P, for example, show the inclusion of a plurality of elongated ribs 1712 extending from each of the upper housing portion 1702 and the lower housing portion 1704. The elongated ribs 1712 are sized and positioned so as to follow the curvature of the filter element 1710 intended for use within the filter housing 1700. The shape of the elongated ribs 1712 may be selected so as to assist in guiding the flow of fluid from the fluid inlet 1706 through the filter element 1710 and towards the fluid outlet 1708. In such an arrangement, the elongated ribs 1712 are constructed and arranged so to protrude towards where the filter element 1710 resides when properly installed within the filter housing 1700. As such, the filter element 1710 is effectively secured within a three dimensional space defined by the respective elongated ribs.

Figure 18A:
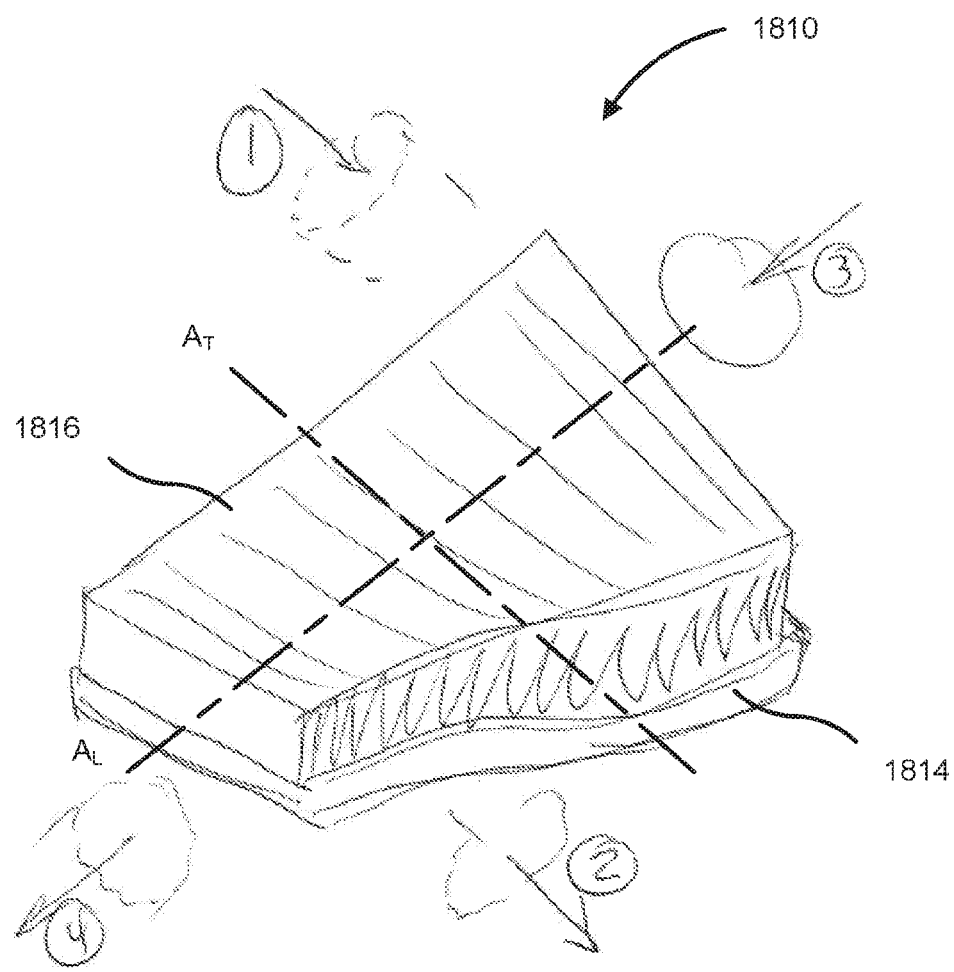
FIG. 18A shows various directions of fluid flow through an example curvilinear filter element.
Figure 18B:
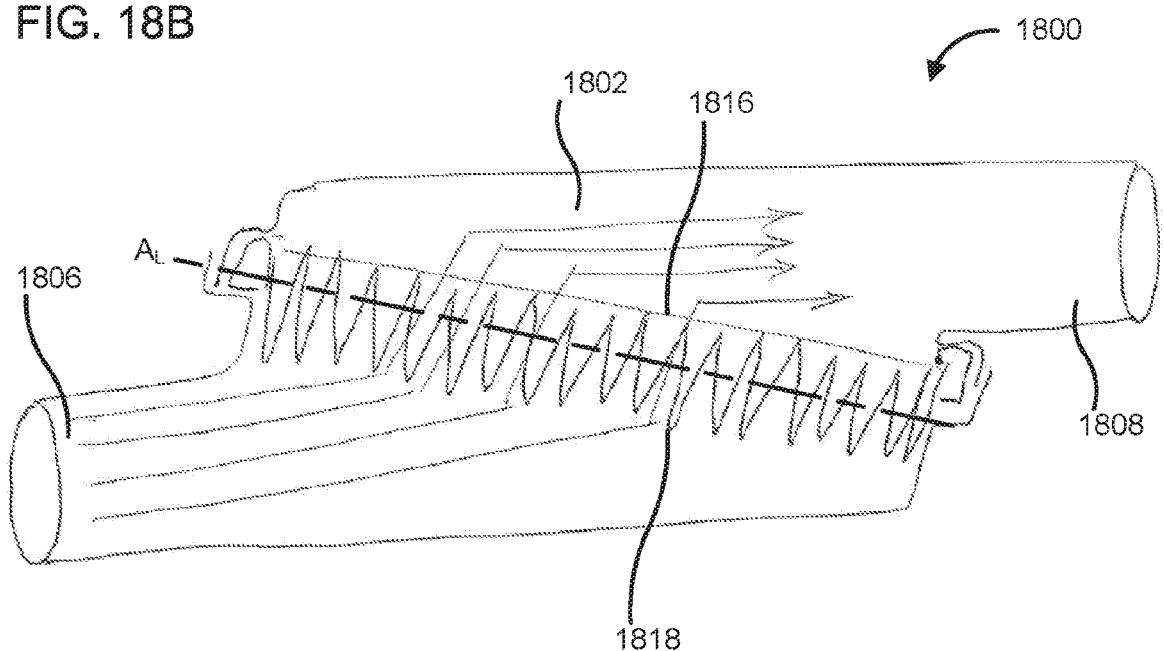
FIG. 18B is a schematic illustration of a direction of fluid flow through a curvilinear filter element positioned along a longitudinal axis in a filter housing.

FIG. 18 is a perspective view of a filter element 1810, according to another embodiment. The filter element 1810 includes a curved panel filter element 1810, as previously described herein. The filter element 1810 generally comprises a pleat block 1812 and a seal member 1814. The pleat block 1812 is a pleated filter media pleat block. The filter element 1810 includes a first face 1816 and second face 1818 (shown in FIG. 18B) opposite the first face 1816. In various embodiments, the filter element 1810 may be substantially similar to the filter element 600 and therefore, not described in further detail herein. The filter element 1810 has a longitudinal axis $A_L$ oriented along a longer edge of the filter element 1810, and a transverse axis $A_T$ oriented perpendicular to the longitudinal axis. In various embodiments, the filter element 1810 may be positioned in a housing such that a direction of fluid flow through the filter element 1810 may be along the transverse axis $A_T$ (i.e., from point 1 to 2) instead of the longitudinal axis $A_L$ (i.e., from point 3 to 4). Flow along the transverse axis $A_T$ may provide less resistance to fluid flow and therefore, reduce backpressure on the fluid entering a housing in which the filter element 1810 is positioned.

FIG. 18B is a schematic illustration of a filter housing 1800, according to an embodiment. The filter housing 1800 includes a filter housing portion 1802 defining an internal volume within which the curved panel filter element 1810 is positioned. The filter housing portion 1802 defines an inlet 1806 and an outlet 1808 located opposite the inlet 1806 and having a flow axis which is offset from a flow axis of the inlet 1806. The filter element 1810 is positioned between the inlet 1806 and the outlet 1810 in an inclined orientation along its longitudinal axis $A_L$ such that the first face 1816 is oriented towards the outlet 1808 and the second face 1818 is oriented towards the inlet 1806. The positioning of the filter element 1810 in the internal volume defined by the filter housing portion 1802 causes a plurality of pleats of the filter element 1810 to be positioned perpendicular to the fluid flow relative to a length wise direction of the plurality of pleats from the inlet 1806 to the outlet 1808. This causes the fluid flow to be substantially perpendicular to pleat lengths of plurality of pleats.

Figure 18C:
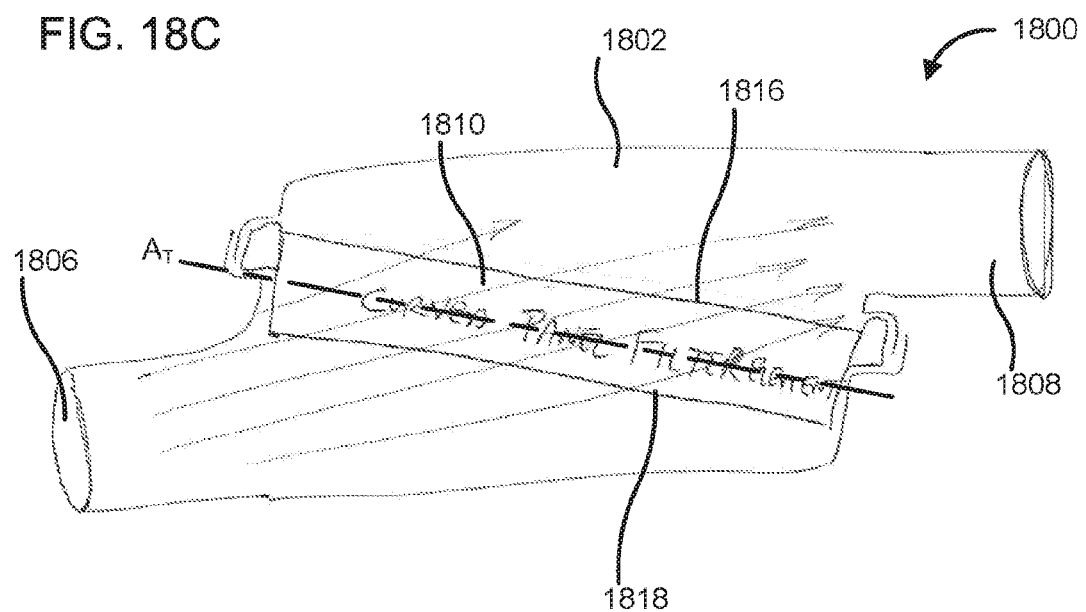
FIG. 18C shows the curvilinear filter element positioned along its transverse axis in the filter housing, according to example embodiments.

FIG. 18C is a schematic illustration of the filter housing 1800, according to an embodiment, with the filter element 1810 positioned between the inlet 1806 and the outlet 1810 in an inclined orientation along its transverse axis $A_T$ such that the first face 1816 is oriented towards the outlet 1808 and the second face 1818 is oriented towards the inlet 1806. This positioning of the filter element 1810 in the internal volume defined by the filter housing portion 1802 causes a plurality of pleats of the filter element 1810 to be positioned parallel to the fluid flow along a length wise direction of the plurality of pleats from the inlet 1806 to the outlet 1808. This causes the fluid flow to be substantially parallel to pleat lengths of plurality of pleats, which may reduce backpressure and improve filtration efficiency.

FIG. 19 is a schematic flow diagram of an example method 1900 for forming a curved panel filter element. The method 1900 includes providing a substantially flat filter media, at 1902. The filter media may include the pleat block 102 or any other filter media described herein without having the bends or curves provided therein. In various embodiments, the filter media may also include a seal member coupled thereto, as previously described herein.

In some embodiments, a release layer is deposited in a mold cavity of a mold, at 1904. The mold cavity may include a curvilinear mold cavity surface. Markings or indicia (e.g., product name, company logo, serial number, etc.) may be etched or embossed on the mold cavity surface, and are imprinted on the polymeric layer during the molding process. The release layer may be formed from a low surface tension release agent, and may be sprayed into the mold cavity. Suitable release agents may include, but are not limited to silicone based releasing agent, a wax based releasing agent, sulfonic release agents, or any other release agents. In other embodiments, the mold cavity surface of the mold cavity may be structured to provide self-release properties. For example, micro or nano sized features may be formed on the mold cavity surface of the mold cavity, so as to reduce a contact angle of droplets of a polymeric layer sprayed or otherwise deposited into the mold cavity, and to significantly reduce adhering of the polymeric layer to the mold cavity surface.

At 1906, a polymeric layer is deposited (e.g., dispensed or spray coated) in the mold cavity. For example, the polymeric layer may be in fluid form (e.g., dissolved in solvent to form a sprayable liquid) or is spray coated on the mold cavity surface of the mold cavity. Any suitable polymeric material may be used. Suitable polymeric materials include but are not limited to polyurethane, polyurea, polyvinyl alcohol, polytetrafluoroethylene, high density polyethylene, polyvinyl chloride, a thermoset polymer, a reinforced polymer, or a combination thereof. In particular embodiments, the polymeric layer comprises a polyurethane formulated to set within a predetermined time, for example, within a range of 10-20 seconds. The polymeric material may be dissolved in a solvent (e.g., acetone, methylene chloride, acetates, dimethyl sulfoxide, chloroform, tetrahydrofuran, an organic non-toxic solvent, any other solvent or combination thereof) so as to form a sprayable liquid. Markings or indicia (e.g., product name, company logo, serial number, etc.) may be etched on surface of the mold cavity surface, which are imprinted on the polymeric layer during the molding process.

At 1908, a side face of the filter media is positioned on the polymeric layer within a predetermined time such that the side face conforms to the curvilinear mold cavity surface and causes the filter media to bend. The predetermined time (e.g., in a range of 10-20 seconds) may be a time period within which the polymeric layer at least partially sets (i.e., reacts or crosslinks). In other embodiments, the first polymeric layer may partially set (e.g., turns from a sprayable liquid to a semi-solid) within the predetermined time so as to facilitate embedding or potting of the side face of the filter media therein when the filter media is positioned on the first polymeric layer. The bending causes the flat pleat block comprising the filter media to curve so that the filter media has a curvilinear profile. At 1910, the side face of the filter element is maintained on the polymeric layer for a predetermined setting time. For example, the predetermined setting time may include a time period that the first polymeric layer takes to completely set (i.e., all the solvent evaporates and the polymeric layer completely solidifies) from the time point at which the first face of the filter media is positioned on the first polymeric layer. In some embodiments, the predetermined setting time may be in a range of 5 seconds to 30 seconds after the predetermined time (e.g., 25 seconds to 50 seconds after the first polymeric layer is deposited in the mold cavity).

At 1912, the filter media with the polymeric layer attached to the side face thereof is removed from the mold cavity. The polymeric layer retains the curvilinear profile of the mold cavity surface and thereby, also maintains the filter media in the curved shape after being removed from the mold cavity. the At 1914, any polymeric layer flash may be trimmed. The side face may be a first side face, and the operations of method 1900 may be repeated for a second side face of the filter media opposite the first side face, or any other side faces of the filter media. Furthermore, a seal member may be positioned around the filter media, at 1916. For example, the seal member may be molded on an suitable end of the filter media.

Figure 20:
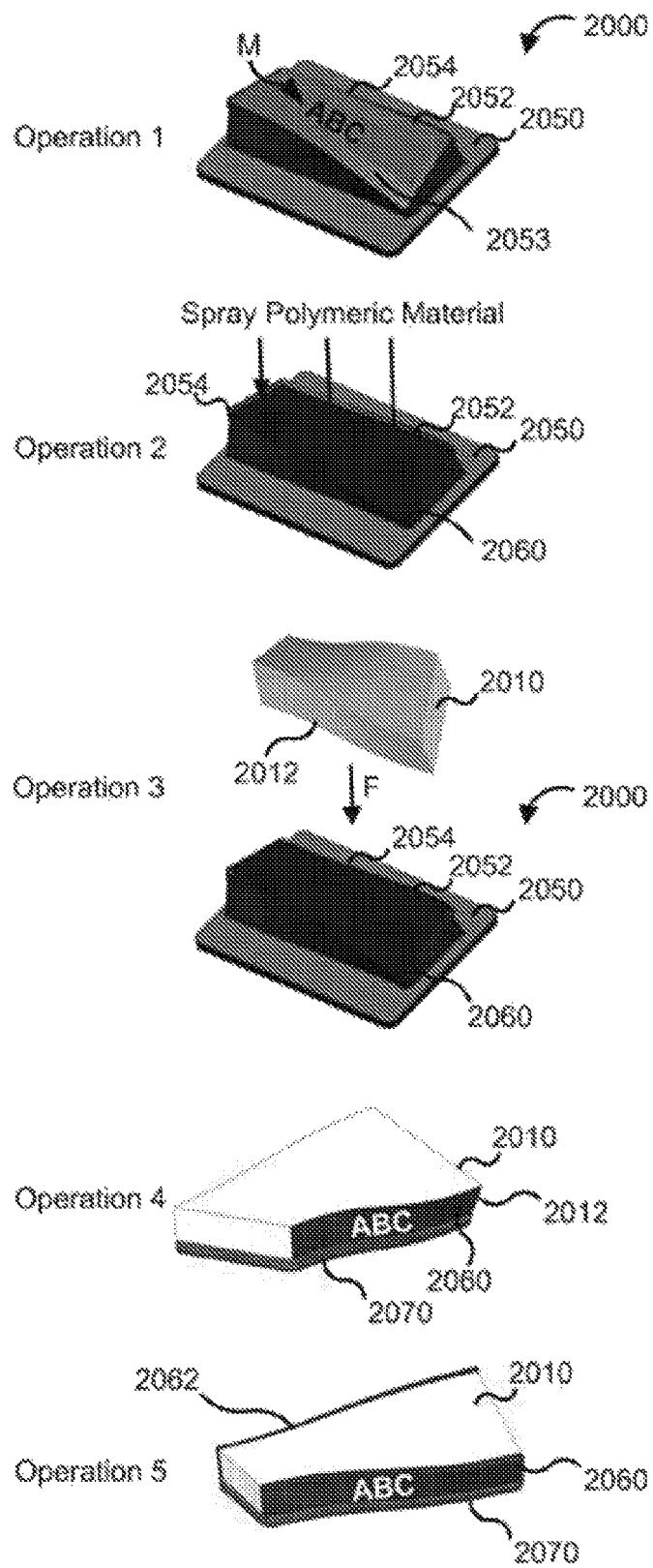
FIG. 20 is an example process flow for forming a curvilinear filter element, according to an embodiment.

FIG. 20 is a process flow for forming a curved panel filter element, according to an embodiment. At operation 1, a mold 2050 is provided. The mold 2050 defines a mold cavity 2052 defining a curvilinear mold cavity surface 2053. A trim ledge 2054 is positioned on a rim of the mold cavity and is configured to facilitate trimming of polymeric layer flash. Markings (e.g., product name, company logo, serial number, etc.) may be etched or embossed on the mold cavity surface 2053.

At operation 2, a polymeric layer 2060 is deposited (e.g., dispensed or spray coated) in the mold cavity. For example, the polymeric layer 2060 may be in fluid form (e.g., dissolved in solvent to form a sprayable liquid) or is spray coated on the mold cavity surface 2053 of the mold cavity 2052. The polymeric layer 2060 may include any suitable polymeric material, for example, polyurethane, polyurea or any other polymeric described herein with respect to method 1900. In various embodiments, a robotic sprayer may be used to deposit the polymeric layer 2060 in the mold cavity 2052. In some embodiments, a release layer may be deposited on the mold cavity surface 2053 before depositing the polymeric layer 2060 thereon.

At operation 3, a first side face 2012 of a filter media 2010 which comprises a flat pleat block is positioned on the polymeric layer 2060 within a predetermined time such that the first side face 2012 conforms to the curvilinear mold cavity surface 2053 causing the filter media 2010 to bend. The bending causes the filter media 2010 to curve so that the filter media 2010 adopts a curvilinear profile. In various embodiments, a robotic manipulator may be used to position and hold the filter media 2010 on the polymeric layer 2060. The first side face 2012 of the filter media 2010 is maintained on the polymeric layer 2060 for a predetermined setting time. At operation 4, the filter media 2010 is removed from the mold cavity 2052 with the polymeric layer 2060 attached to the first side face 2012, and the filter media 2010 retaining the curvilinear profile. A seal member 2070 may be coupled to the filter media 2010 (e.g., molded thereon). In some embodiments, a second polymeric layer 2062 may also be attached to a second side face of the filter media 2010 opposite the first side face 2012, as shown in operation 5. Two polymeric layers 2060, 2062 on opposing sides of the filter media may provide better retention of the curvilinear profile of the filter media 2010 relative to embodiments in which only a single polymeric layer is used.

It should be noted that any use of the term "example" herein to describe various embodiments is intended to indicate that such embodiments are possible examples, representations, and/or illustrations of possible embodiments (and such term is not intended to connote that such embodiments are necessarily extraordinary or superlative examples).

The terms "coupled" and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

As utilized herein, the terms "substantially" and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise arrangements and/or numerical ranges provided. Accordingly, these terms should be interpreted as indicating that insubstantial or inconsequential modifications or alterations of the subject matter described and claimed are considered to be within the scope of the inventions as recited in the appended claims.

References herein to the positions of elements (e.g., "top," "bottom," "above," "below," etc.) are merely used to describe the orientation of various elements in the figures. It should be noted that the orientation of various elements may differ according to other example embodiments, and that such variations are intended to be encompassed by the present disclosure.

It is important to note that the construction and arrangement of the various example embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Additionally, features from particular embodiments may be combined with features from other embodiments as would be understood by one of ordinary skill in the art. Other substitutions, modifications, changes and omissions may also be made in the design, operating conditions and arrangement of the various example embodiments without departing from the scope of the present invention.

What is claimed is:

1. A method for forming a curvilinear filter element, comprising:
   providing a substantially flat filter media, the filter media comprising an inlet face, an outlet face, and a side face extending between the inlet face and the outlet face;
   depositing a polymeric layer in a mold cavity of a mold, the mold cavity comprising a curvilinear mold cavity surface having a curvilinear profile, the polymeric layer deposited on the curvilinear mold cavity surface;
   positioning the side face of the filter media on the polymeric layer within a predetermined time after disposing the polymeric layer in the mold cavity such that the side face conforms to the curvilinear mold cavity surface causing the filter media to bend; and
   removing the filter media with the polymeric layer attached to the side face of the filter media from the mold cavity, wherein the polymeric layer retains the curvilinear profile of the curvilinear mold cavity surface.

2. The method of claim 1, further comprising, before removing the filter media from the mold cavity, maintaining the side face of the filter media on the polymeric layer for a predetermined setting time.

3. The method of claim 1, further comprising positioning a seal member around the filter media.

4. The method of claim 1, wherein the polymeric layer is a first polymeric layer and the side face is a first side face, the method further comprising:
depositing a second polymeric layer in the mold cavity of the mold;
positioning a second side face of the filter media, on the second polymeric layer within a predetermined time such that the second side face conforms to the curvilinear mold cavity surface, the second side face opposite the first side face; and
removing the filter media with the second polymeric layer attached to the second side surface of the filter media from the mold cavity.

5. The method of claim 1, further comprising depositing a release agent in the mold cavity of the mold.

6. The method of claim 5, wherein the release agent is one of a silicone based releasing agent, a wax based releasing agent, and a sulfonic release agent.

7. The method of claim 1, wherein the curvilinear mold cavity surface includes self-releasing properties comprising micro- or nano-sized features so as to reduce a contact angle of droplets of the polymeric layer.

8. The method of claim 1, wherein the predetermined time is between 10 and 20 seconds, inclusive.

9. The method of claim 2, wherein the predetermined setting time is between 5 and 30 seconds, inclusive.

10. A filter element comprising:
filter media forming a pleat block having an inlet face, an outlet face, and a side extending between the inlet face and the outlet face;
a frame comprising a semi-rigid panel coupled to the side of the pleat block; and
a seal member coupled to the pleat block, wherein the seal member wraps around the pleat block;
wherein the frame maintains the inlet face and the outlet face in a non-planar shape when the filter element is in an uninstalled position.

11. The filter element of claim 10, wherein the inlet face and the outlet face are substantially circular and concentric about an axis.

12. The filter element of claim 10, wherein an inlet surface area of the inlet face is greater than an outlet surface area of the outlet face.

13. The filter element of claim 10, wherein:
the pleat block is substantially rectangular and includes long sides and short sides extending between the inlet face and the outlet face;
the semi-rigid panel is a first semi-rigid panel coupled to the pleat block along one of the two long sides; and
the filter element further comprising a second semi-rigid panel coupled to the pleat block along the other of the two long sides.

14. The filter element of claim 13, wherein the folds of the pleat block are perpendicular to the first semi-rigid panel and the second semi-rigid panel.

15. A filter element comprising:
filter media forming a substantially rectangular pleat block, the pleat block having:
an inlet face and an outlet face parallel to the inlet face;
a short sidewall extending along the short side of the pleat block between the inlet face and the outlet face; and
a long sidewall extending along the long side of the pleat block between the inlet face and the outlet face;
a seal member coupled to the pleat block; and
a locking tab extending from the seal member, the locking tab configured to secure the filter element in a filtration system housing.

16. The filter element of claim 15, wherein the locking tab extends away from the short side of the pleat block in a direction perpendicular to the short sidewall.

17. The filter element of claim 15, wherein the seal member is formed of a flexible material such that the pleat block is conformable into a non-rectangular shape where the inlet face and the outlet face are non-planer.

18. The filter element of claim 17, wherein the pleat block in conformable into the non-rectangular shape where the inlet face has an inlet surface area greater than an outlet surface area of the outlet face.

19. The filter element of claim 16, wherein the locking tab is a first locking tab extending away from a first short side of the pleat block, the filter element further comprising a second locking tab extending away from a second short side of the pleat block in a direction perpendicular to the short sidewall, the second short side opposite the first short side, the second locking tab configured to cooperate with the first locking tab to secure the pleat block in a filtration housing.

* * * * *